US007530381B2

(12) United States Patent
Walsh et al.

(10) Patent No.: US 7,530,381 B2
(45) Date of Patent: May 12, 2009

(54) TRANSFER GLUE SYSTEM AND METHOD FOR A RIGHT ANGLE GLUING MACHINE

(75) Inventors: Joseph C. Walsh, Boulder, CO (US); Kenneth E. Hawkins, Loveland, CO (US)

(73) Assignee: Graphic Packaging International, Inc., Marietta, GA (US)

( * ) Notice: Subject to any disclaimer, the term of this patent is extended or adjusted under 35 U.S.C. 154(b) by 215 days.

(21) Appl. No.: 11/208,685

(22) Filed: Aug. 22, 2005

(65) Prior Publication Data

US 2006/0005764 A1 Jan. 12, 2006

Related U.S. Application Data

(62) Division of application No. 10/735,534, filed on Dec. 12, 2003, now Pat. No. 6,948,615, which is a division of application No. 09/877,336, filed on Jun. 8, 2001, now Pat. No. 6,689,034.

(51) Int. Cl.
*B32B 41/00* (2006.01)

(52) U.S. Cl. .................................................... 156/357

(58) Field of Classification Search ................ 493/128, 493/130, 131, 132, 150, 151, 264; 53/376.5, 53/377.4, 383.1; 156/356, 357, 442.2, 578
See application file for complete search history.

(56) References Cited

U.S. PATENT DOCUMENTS

| | | | | |
|---|---|---|---|---|
| 3,353,459 | A * | 11/1967 | Owsley | 493/96 |
| 3,572,543 | A | 3/1971 | Forrer et al. | |
| 5,024,709 | A * | 6/1991 | Faulkner et al. | 156/69 |
| 5,656,709 | A * | 8/1997 | Fukushima et al. | 528/9 |
| 5,979,645 | A | 11/1999 | Holley, Jr. | |

* cited by examiner

*Primary Examiner*—George R Koch, III
(74) *Attorney, Agent, or Firm*—Womble Carlyle Sandridge & Rice, PLLC

(57) ABSTRACT

Disclosed herein is a method and apparatus for applying adhesive to packaging in a variety of configurations. The adhesive may be applied by a nozzle in a first direction, a second direction and a stationary spot, wherein the first direction and the second direction are transverse to each other.

29 Claims, 30 Drawing Sheets

TRANSFER GLUE SYSTEM AND METHOD FOR A RIGHT ANGLE GLUING MACHINE

CROSS-REFERENCE TO RELATED APPLICATIONS

This application is a divisional of U.S. patent application Ser. No. 10/735,534 filed Dec. 12, 2003, now U.S. Pat. No. 6,948,615, issued Sep. 27, 2005, which is a divisional of 09/877,336 filed Jun. 8, 2001, now U.S. Pat. No. 6,689,034 issued Feb. 10, 2004, for TRANSFER GLUE SYSTEM AND METHOD FOR A RIGHT ANGLE GLUING MACHINE of Walsh et al., both of which are incorporated herein by reference for all that is disclosed therein.

FIELD OF THE INVENTION

The present invention is directed towards the field of packaging equipment and packaging construction.

BACKGROUND OF THE INVENTION

Once, primarily used to package the aggressive surfactants of concentrated detergents, laminate film packaging is now used for numerous applications including: soap boxes, cereal boxes, bottle carriers, can boxes, etc. The components of laminate film packaging include a layer of printed film and paperboard. The paperboard serves as a substrate to which the film layer is laminated. The laminate film may be surface printed or reverse printed film to allow for superb graphics while adding extra strength to the paperboard. An optional metalization layer deposited on the laminate film often replaces hard-to-recycle foil without losing the eye-catching brilliance of foils.

The advantages of laminate film packaging include adaptability to package detergents, chemicals, food or products. Laminate film packaging may be used for liquids, solids, or powders. The laminate film provides strength to the composition, therefore allowing for thinner, recycled, or otherwise lower strength paperboard to be used. Laminate film packaging is environmentally sound because in many situations it is made from post-consumer recycled fibers and is itself recyclable. Products packaged in laminate film packaging may have lower contamination levels due to the barrier properties of the film, resulting in products staying fresher longer and reaching the end-user in better condition. The graphic quality of the laminate film packaging may be high in comparison to conventional packaging technologies; in a retail-age when the packaging "sells" the product, the quality of the graphics is of the utmost importance.

Typically, laminate film packaging is made from recycled materials. Most often, the paperboard is a Double-Kraft Lined (DLK) product. DLK paperboard consists of mixed fibers in the inner plies with one ply of Kraft on either side for strength.

Typically, the film used for laminate film packaging is polyethylene (PE), polypropylene (PP), or polyethylene terephthalate (PET). The film may be provided with a unique characteristic such as a holographic or mean pattern.

The optional metalization layer may be included to provide a barrier layer for improved graphics. The improved graphics is a result of the reflectivity of the metalization layer. The metalization layer is provided on a surface of the film by vapor deposition and is commonly an aluminum layer.

Adhesive is used to assemble laminate film packaging. Two types of adhesive are conventionally used. The first type of adhesive is a cold glue and the second type is a hot glue.

The cold glue is an adhesive dissolved in a volatile carrier. The cold glue is applied to the laminate film packaging in a wet condition. Upon assembling the packaging, the volatile carrier is wicked from the adhesive into the paperboard or evaporated. The resulting dry adhesive provides tack to attach one section of the packaging to another. Since the volatile carrier needs to be removed from the cold glue, cold glue typically works better on plain paperboard without laminate film. The cold glue works sufficiently well on attaching laminate film packaging where a paperboard-to-paperboard attachment is required. Additionally, the packaging may be assembled with cold glue having a film-to-paperboard attachment. However, it is extremely difficult to obtain a satisfactory film-to-film attachment using cold glue. Cold glue may be dispensed from a nozzle or a cold glue pot. The nozzle for cold glue is often controlled by a solenoid that is actuated by a control system. The cold glue pot is a pad-printing device wherein a rotating pad has a raised area. The raised area picks-up glue from the glue pot and transfers it to the packaging.

Hot glue is an adhesive that is semi-fluid when hot and solid when cold. The hot glue is applied hot to packaging. Before the hot glue cools, the packaging is assembled. The hot glue is then cooled to provide an attachment between the two parts of the package. The hot glue provides a sufficient bond on film-to-film applications as well as paperboard-to-film and paperboard-to-paperboard attachment. Hot glue is most commonly dispensed from a nozzle. The nozzle is typically actuated by a solenoid that is controlled by a control system. As shown in FIG. 1, hot glue 20 is dispensed on a package 40 from a nozzle 50 during a glue dispensing condition. The package 40 moves in a forward direction 60 resulting in the hot glue 20 being dispensed in a line. The package 40 may be provided with a laminate film 30 on one side of the package 40. The hot glue 20 is dispensed until the nozzle 50 is turned off. The period following the dispensing condition is a post glue dispensing condition. Because the hot glue 20 is semi-fluid with a high viscosity, it stretches from the nozzle 50 after the nozzle 50 is turned off. During the post gluing dispensing condition as the package passes under the nozzle 50, a trailing end 70 (FIG. 2) of the hot glue 20 dispenses onto the package 40 in a non-exact manner.

Referring now to FIG. 2, it is difficult if not nearly impossible to control the actual location of the trailing end 70 of the hot glue 20. As a result of the difficulty of controlling the trailing end 70, the trailing end 70 may pass into a zone 80 where hot glue 20 is not desired. The zone 80 may be a fold area, an edge 44 of the package 40 or a location of two non-joined panels.

Packaging may be printed on one or both sides. Often paperboard is precut into a blank. The blank is inserted into a separate machine or in-line section of a continuous machine for gluing and folding. Gluing and folding is often completed while the package is moving at a speed in a progressive, continuous manner. The end result is a package ready to receive product for distribution and sale.

FIG. 3 shows a schematic representation of a conventional right angle gluing machine 100. The conventional gluing machine 100 is provided with an x-axis subsystem 102, a conventional transfer system 104 and a y-axis subsystem 106. The conventional right angle gluing machine 100 is provided to receive a blank 200 and process it into a completed package 202. The blank 200 travels in an x-axis direction 108 down the length of the x-axis subsystem 102 into the conventional transfer system 104. The conventional transfer system 104 receives the blank in the x-axis direction 108 and transfers it to a y-axis direction 110. The blank 200 is then ejected from the conventional transfer system 104 to the y-axis subsystem 106 traveling in the y-axis direction 110. After traveling the length of the y-axis subsystem 106, the blank 200 is converted to the completed package 202.

Having provided a brief overview of the conventional gluing machine 100, the individual subsystems will now be discussed in detail.

The x-axis subsystem 102 may be provided with a first folding station 122, an x-axis glue station 124, an x-axis progressive folding station 126 and an acceleration roll 128.

The conventional transfer system 104 may be provided with a conventional top cover 130, a pair of drive chains 140, a plurality of drive chain lugs such as a pair of chain lugs 142, and a V-stop 152.

The y-axis subsystem 106 may be provided with a y-axis glue station 144 and a y-axis progressive folding station 146. The specific tasks performed by the aforementioned components will be described by-way-of example herein.

Although countless packages are manufactured on the conventional right angle gluing machine 100, the package illustrated in the drawings and discussed in the specifications is a bottle carrier. It should be noted that the description of the bottle carrier is intended to provide an exemplary application for the conventional right angle gluing machine 100, but is not the only article manufactured by the machine.

As shown best in FIG. 4, a laminate film side of the bottle carrier blank 200 may be provided with a back panel graphic 204 and a front panel graphic 206. The back panel graphic 204 and front panel graphic 206 may be applied to the blank 200 in a number of ways well known in the art. The graphics 204, 206 may provide point-of-purchase marketing, directions, or other information as required for the particular application.

Referring to FIG. 5, the bottle carrier blank 200 may be provided with a variety of panels, partitions, glue flaps, features and fold lines. The blank 200 may be provided with a back panel 208, a left back panel 210, a right back panel 220, a bottom back panel 222, a bottom front panel 224, a front panel 226, a left front panel 228 and a right front panel 230.

The blank 200 may also be provided with a front spine 240, a back spine 242, a left front partition 244, a right front partition 246, a left back partition 248 and a right back partition 250. The blank 200 may also be provided with a right back glue flap 260, a right front glue flap 262, a front glue flap 264, a front partition glue flap 266, a left front partition glue flap 268, a right front partition glue flap 270, a back partition glue flap 274, a left back partition glue flap 280 and a right back partition glue flap 282.

The blank 200 may also be provided with a handle 284 having a front handle portion 286, a back handle portion 288, a front handle reinforcement portion 290 and a back handle reinforcement portion 300.

The blank 200 may also be provided with a left back fold line 302, a right back fold line 304, a bottom back fold line 306, a center bottom fold line 308, a right back glue flap fold line 310, a back spine fold line 320, a right front fold line 322, a left front fold line 324, a front glue flap fold line 326, a right front glue flap fold line 328, a front spine fold line 330, a center spine fold line 340, a front partition fold line 342, a back partition fold line 344, a left front partition fold line 346, a left front partition glue flap fold line 348, a right front partition fold line 350, a right front partition glue flap fold line 360, a left back partition fold line 362, a left back partition glue flap fold line 364, a right back partition fold line 366, a right back partition glue flap fold line 368, a left front handle fold line 370, a left back handle fold line 372, a center handle fold line 380, a right front handle fold line 382, a right back handle fold line 384, a handle reinforcement center fold line 385 and a right glue flap center fold line 386.

Referring to FIG. 7, the blank 200 (not shown in FIG. 7, however the blank 200 may be substantially similar to the first intermediate form 214) may be provided with a first right front glue area 390, a second right front glue area 400, a right back glue area 402, a first handle glue area 404, a second handle glue area 406, a third handle glue area 408, a fourth handle glue area 410, a fifth handle glue area 420, a first front spine glue area 422, a second front spine glue area 424, a first back spine glue area 426, a second back spine glue area 428, a left front partition glue area 430, a right front partition glue area 440, a left back partition glue area 442 and a right back partition glue area 444. The first right front glue area 390 may be provided on the paperboard side of the right front glue flap 262. The second right front glue area 400 may be provided on the paperboard side of the right front glue flap 262 near the right glue flap center fold line 386. The right back glue area 402 may be provided on the paperboard side of the right back glue flap 260. The first handle glue area 404 may be provided on the paperboard side of the front handle portion 286 and the back handle portion 288, crossing over the center handle fold line 380. The second handle glue area 406 and the third handle glue area 408 may be provided on the paperboard side of the front handle portion 286. The fourth handle glue area 410 and the fifth handle glue area 420 may be provided on the paperboard side of the back handle portion 288. The first front spine glue area 422 and the second front spine glue area 424 may be provided on the paperboard side of the front spine 240. The first back spine glue area 426 and the second back spine glue area 428 may be provided on the paperboard side of the back spine 242. The left front partition glue area 430 may be provided on the paperboard side of the left front partition glue flap 268. The right front partition glue area 440 may be provided on the paperboard side of the right front partition glue flap 270. The left back partition glue area 442 may be provided on the laminate film side of the left back partition glue flap 280. The right back partition glue area 444 may be provided on the laminate film side of the right back partition glue flap 282.

Referring to FIG. 9, the blank 200 (not shown in FIG. 9, however the blank 200 may be substantially similar to the fourth intermediate form 218) may be provided with a third front spine glue area 460, a fourth front spine glue area 462, a fifth front spine glue area 464, a sixth front spine glue area 466, a seventh front spine glue area 468, a sixth handle glue area 470, a seventh handle glue area 472, a front partition glue area 480, an eighth front spine glue area 482, a third right back glue area 484, a fourth right back glue area 486, a fifth right back glue area 488, a sixth right back glue area 490, a seventh right back glue area 500 and a first bottom glue area 502. The third front spine glue area 460 may be provided on the film side of the front spine 240. The fourth front spine glue area 462 may be provided on the film side of the front spine 240. The fifth front spine glue area 464 may be provided on the film side of the front spine 240. The sixth front spine glue area 466 may be provided on the film side of the front spine 240. The seventh front spine glue area 468 may be provided on the film side of the front spine 240. The sixth handle glue area 470 may be provided on the paperboard side of the front handle portion 286. The seventh handle glue area 472 may be provided on the paperboard side of the back handle portion 288. The front partition glue area 480 may be provided on the paperboard side of the front partition glue flap 266. The eighth front spine glue area 482 may be provided on the film side of the front spine 240. The third right back glue area 484 may be provided on the film side of the right back partition glue flap 282. The fourth right back glue area 486 may be provided on the laminate film side of the right front glue flap 262. The fifth right back glue area 488 may be provided on the laminate film side of the right front glue flap 262. The sixth right back glue area 490 may be provided on the laminate film side of the right front glue flap 262. The seventh right back glue area 500 may be provided on the laminate film side of the right front glue flap 262. The first bottom glue area 502 may be provided on the paperboard side of the front glue flap 264.

Referring to FIG. 5, having provided the elements of the blank 200, the relationship of the elements will now be described in detail herein.

The bottom back panel 222 may be pivotally attached to the back panel 208 at the bottom back fold line 306. The bottom front panel 224 may be pivotally attached to the bottom back panel 222 at the center bottom fold line 308. The right back panel 220 may be pivotally attached to the back panel 208 at the right back fold line 304. The right back glue flap 260 may be pivotally attached to the right back panel 220 at the right back glue flap fold line 310. The left back panel 210 may be pivotally attached to the back panel 208 at the left back fold line 302. The back spine 242 may be pivotally attached to the left back panel 210 at the back spine fold line 320. The back partition glue flap 274 may be pivotally attached to the back spine 242 at the back partition fold line 344. The left back partition 248 may be pivotally attached to the back partition glue flap 274 at the left back partition fold line 362. The left back partition glue flap 280 may be pivotally attached to the left back partition 248 at the left back partition glue flap fold line 364. The right back partition 250 may be pivotally attached to the back partition glue flap 274 at the right back partition fold line 366. The right back partition glue flap 282 may be pivotally attached to the right back partition 250 at the right back partition glue flap fold line 368. The front spine 240 may be pivotally attached to the back spine 242 at the center spine fold line 340. The front partition glue flap 266 may be pivotally attached to the front spine 240 at the front partition fold line 342. The left front partition 244 may be pivotally attached to the front spine 240 at the left front partition fold line 346. The left front partition glue flap 268 may be pivotally attached to the left front partition 244 at the left front partition glue flap fold line 348. The right front partition 246 may be pivotally attached to the front spine 240 at the right front partition fold line 350. The right front partition glue flap 270 may be pivotally attached to the right front partition 246 at the right front partition glue flap fold line 360. The left front panel 228 may be pivotally attached to the front spine 240 at the front spine fold line 330. The front panel 226 may be pivotally attached to the left-front panel 228 at the left front fold line 324. The front glue flap 264 may be pivotally attached to the front panel 226 at the front glue flap fold line 326. The right front panel 230 may be pivotally attached to the front panel 226 at the right front fold line 322. The right front glue flap 262 may be pivotally attached to the right front panel 230 at the right front glue flap fold line 328. The right front glue flap 262 may be pivotally attached to the right back glue flap 260 at the right glue flap center fold line 386. The front handle portion 286 may be pivotally attached to the front spine 240 at the left handle fold line 370. The back handle portion 288 may be pivotally attached to the back spine 242 at the left back handle fold line 372. The front handle portion 286 may be pivotally attached to the back handle portion 288 at the 380. The front handle reinforcement portion 290 may be pivotally attached to the front handle portion 286 at the right front handle fold line 382. The back handle reinforcement portion 300 may be pivotally attached to the back handle portion 288 at the right back handle fold line 384. The front handle reinforcement portion 290 may be pivotally attached to the back handle reinforcement portion 300 at the handle reinforcement center fold line 385.

Referring to FIG. 3, the various panels and fold lines result in the blank 200 being capable of being glued and folded by the conventional right angle gluing machine 100. The resulting glued and folded blank 200 is the completed package 202.

Having provided a detailed description of the blank 200 and its elements, assembly of the completed package 202 will now be described. As best shown in FIG. 6, the blank 200 undergoes a progression of gluing and folding steps to transform the blank 200 to the completed package 202. The steps to make the completed package 202 may include a first folding step, a first gluing step, a second folding step, a change-of-direction step, a second gluing step and a third folding step. The steps to make the completed package 202 may result in a first intermediate form 212, a second intermediate form 214 (detailed in FIG. 7), a third intermediate form 216 (detailed in FIG. 8) and a fourth intermediate form 218 (detailed in FIG. 9).

Referring now to FIG. 3, the blank 200 may be introduced to the x-axis subsystem 102 of the conventional gluing machine 100 from a delivery stack 148. The paperboard side of the blank 200 may be facing up when introduced to the conventional gluing machine 100. The orientation of the blank 200 may be such that the front partition glue flap 266 and the front glue flap 264 lead the blank 200 as it travels in the x-axis direction 108. The blank 200 is driven down the length of the x-axis subsystem 102 by belts and rollers.

Referring still to FIG. 3, the first station that the blank 200 is delivered to is the first folding station 122. At the first folding station 122 the blank 200 is converted to the first intermediate form 212 during the first folding step. To accomplish the conversion to the first intermediate form 212, the front partition glue flap 266 is folded under the blank 200 about the front partition fold line 342 (also line E-E) as shown in FIG. 7. This folding about line E-E results in the laminate side of the front partition glue flap 266 coming into contact with the laminate side of the front spine 240. Additionally, the back partition glue flap 274 and all panels operationally attached thereto are folded over the blank 200 about the back partition fold line 344 (also line F-F). This folding about line F-F results in the paperboard side of the back partition glue flap 274 coming into contact with the paperboard side of the back spine 242. Having folded the front partition glue flap 266 and the back partition glue flap 274, the first intermediate form 212 (FIG. 6) now exists.

Referring to FIG. 3, the first intermediate form 212 travels further in the x-axis subsystem 102 to the x-axis glue station 124 where the first gluing step may occur. As best shown in FIG. 7, the first intermediate form 212 (FIG. 6) receives glue from the x-axis glue station 124 thereby converting the first intermediate form 212 into the second intermediate form 214. The glue applied by the x-axis glue station 124 may be cold glue dispensed from a cold glue pot system. The x-axis glue station 124 may provide glue on the first right front glue area 390, the second right front glue area 400, the right back glue area 402, the first handle glue area 404, the second handle glue area 406, the third handle glue area 408, the fourth handle glue area 410, the fifth handle glue area 420, the first front spine glue area 422, the second front spine glue area 424, the first back spine glue area 426, the second back spine glue area 428, the left front partition glue area 430, the right front partition glue area 440, the left back partition glue area 442 and the right back partition glue area 444.

Referring to FIG. 3, the second intermediate form 214 travels further in the x-axis subsystem 102 to the x-axis progressive folding station 126 where the second folding step may occur. At the x-axis progressive folding station 126, portions of the second intermediate form 214 are folded to convert the second intermediate form 214 to the third intermediate form 216. Referring to FIG. 8, while traveling through the x-axis progressive folding station 126 (FIG. 3), the front spine 240 may be folded about the front spine fold line 330 (also line G-G) such that the front spine 240 overlies a portion of the left front panel 228 and the front panel 226. The folding of the front spine 240 may result in the glue located on the left front partition glue area 430 and the glue located on the right front partition glue area 440 adhesively attaching the left front partition glue flap 268 and the right front partition glue flap 270 to the front panel 226, respectively. Additionally, the glue located on the first front spine glue area 422 and the glue located on the second front spine glue area 424 may attach the paperboard side of the front handle portion 286 to the paperboard side of the front spine 240. The back spine 242 may be operatively attached to the front spine 240 by the center spine fold line 340, resulting in folding of the back spine 242. The back spine 242 may fold about the back spine fold line 320 (G-G) to bring the back partition glue area 442 and the glue located on the right back partition glue area 444 into contact with the back panel 208. Additionally, the glue located on the first back spine glue area 426 and the glue located on the second back spine glue area 428 may attach to the paperboard side of the back handle portion 288.

The next fold that occurs in the x-axis progressive folding station 126 may be the folding of the right front panel 230 about the right front fold line 322 (also line H-H) such that the right front panel 230 overlies a portion of the front panel 226. The folding of the right front panel 230 may result in the joining of the glue located on the first right front glue area 390 to the paperboard side of the front partition glue flap 266. Additionally, the glue located on the second handle glue area 406 and the glue located on the third handle glue area 408 may attached to the paperboard side of the right front glue flap 262. The folding of the right front panel 230 may also result in the joining of the glue located on the second right front glue area 400 to the film side of the front spine 240. The right back panel 220 may be operatively attached to the right front panel 230 by the right glue flap center, fold line 386. Therefore, the folding of the right front panel 230 may result in the folding of the right back panel 220 about the right back fold line 304. The folding of the right back panel 220 may result in the glue located on the right back glue area 402 contacting the laminate side of the back spine 242. Additionally, the glue located on the fourth handle glue area 410 and the glue located on the fifth handle glue area 420 may attach to the paperboard side of the right back glue flap 260. The folding during the second folding step of the second intermediate form 214 (FIG. 7) may result in the third intermediate form 216.

Referring to FIG. 3, the third intermediate form 216 continues traveling in the x-axis direction 108 from the x-axis progressive folding station 126 into the acceleration roll 128. While in the acceleration roll 128, the third intermediate form 216 accelerates in the x-axis direction 108. It is necessary to accelerate the third intermediate form 216 in order to create time to bring the entire third intermediate form 216 into the conventional transfer system 104. During the period that the third intermediate form 216 is located in the conventional transfer system 104, the conventional top cover 130 may hold the third intermediate form 216 flat. Additionally, the only openings in the conventional top cover 130 are the conventional top cover openings 150. The conventional top cover openings 150 are provided for accommodating the chain lugs 142. The third intermediate form 216 may be stopped in the conventional transfer system 104 by the V-stop 152. The V-stop 152 nearly instantaneously stops the third intermediate form 216 by catching the third intermediate form 216 at the front glue flap 264. After the third intermediate form 216 is stopped, the chain lugs 142 contact the right front fold line 322 (FIG. 8) and the right back fold line 304 (FIG. 8). The chain lugs 142 drive the third intermediate form 216 in the y-axis direction 110 during the change-of-direction step. The third intermediate form 216 may be ejected from the conventional transfer system 104 into the y-axis subsystem 106 by the chain lugs 142.

Upon entering the y-axis subsystem 106 the third intermediate form 216 progresses in the y-axis direction 110 into the y-axis glue station 144. At the y-axis glue station 144 the third intermediate form 216 receives hot glue during the second gluing step from hot glue guns to create the fourth intermediate form 218. Referring to FIG. 9, the y-axis glue station 144 (FIG. 3) may provide glue to the third front spine glue area 460, the fourth front spine glue area 462, the fifth front spine glue area 464, the sixth front spine glue area 466, the seventh front spine glue area 468, the sixth handle glue area 470, the seventh handle glue area 472, the front partition glue area 480, the eighth front spine glue area 482, the third right back glue area 484, the fourth right back glue area 486, the fifth right back glue area 488, the sixth right back glue area 490, the seventh right back glue area 500 and the first bottom glue area 502. All of the glue applied by the y-axis glue station 144 (FIG. 3) is parallel to the y-axis direction 110 on lines, B-B. Exemplary lines B-B are shown in FIG. 9 on the seventh front spine glue area 468, the sixth handle glue area 470, the fifth right back glue area 488 and the first bottom glue area 502. The application of glue to the third intermediate form 216 (FIG. 8) results in a conversion to the fourth intermediate form 218.

The fourth intermediate form 218 may proceed in the y-axis direction 110 (FIG. 3) to the y-axis progressive fold station 146 during the third folding step. Referring now to FIG. 9, the first operation in the y-axis progressive fold station 146 (FIG. 3) may complete is folding of the front handle reinforcement 10 portion 290 about the right front handle fold line 382 (also G-G). The front handle reinforcement portion 290 may be operatively attached to the back handle reinforcement portion 300 by the handle reinforcement center fold line 385. Therefore, folding the front handle reinforcement portion 290 about the right front handle fold line 382 may result in the folding of back handle reinforcement portion 300 about the right back handle fold line 384 (G-G). Folding of the front handle reinforcement portion 290 and the back handle reinforcement portion 300 may result in the glue located on the seventh handle glue area 472 attaching to the paperboard side of the front handle reinforcement portion 290 and the back handle reinforcement portion 300 to the handle 284. The folding of the front handle reinforcement portion 290 and the back handle reinforcement portion 300 also captures the right front glue flap 262 and the right back glue flap 260 near the right glue flap center fold line 386 between the front handle reinforcement portion 290 and back handle reinforcement portion 300 and the handle 284. The next fold in the y-axis progressive fold station 146 may be the folding of the bottom front panel 224 about the center bottom fold line 308 (also I-I). The fold about line I-I may result in the paperboard side of the bottom back panel 222 contacting the paperboard side of the bottom front panel 224. Next the front panel 226 and all the portions operatively attached thereto are folded along the spine fold line D-D. The folding of the front panel 226 about spine fold line D-D may result in the contact of the glue located on the first bottom glue area 502 to the laminate film side of the bottom front panel 224. Additionally the glue located on the third front spine glue area 460, the fourth front spine glue area 462, the fifth front spine glue area 464, the sixth front spine glue area 466, the seventh front spine glue area 468 and the eighth front spine glue area 482 may contact the film side of the back spine 242. The folding about the spine fold line D-D may also cause the hot glue located on the front partition glue area 480 to contact the paperboard side of the back partition glue flap 274. The glue located on the third right back glue area 484, the fourth right back glue area 486, the fifth right back glue area 488, the sixth right back glue area 490 and the seventh right back glue area 500 may contact the film side of the right back glue flap 260. It is important to note that since the various hot glue applied during the second gluing step to the glue areas 460, 462, 464, 466, 468, 484, 486, 488 and 490 are applied to the laminate film side rather than the paperboard side. Additionally these glue strips are used to adhere the laminated film side of the fourth intermediate form 218 together. The folding performed at the y-axis progressive fold station 146 (FIG. 3) results in the conversion of the fourth intermediate form 218 to the completed package 202 (FIG. 10).

Referring to FIG. 3, the completed package 202 travels further in the y-axis subsystem 106 to a compression stack 160. The compression stack 160 is a collection of completed packages 202 where pressure is applied for a period of time. The pressure and time allows for sufficient attachment between panels by the glue. After exiting from the y-axis subsystem 106, a completed package 202 may be erected into an erected package 190 (FIG. 11). The erected carrier 190 may receive six bottles for distribution.

As shown in the figures and described in the specifications, the front handle reinforcement portion 290 and the back handle reinforcement portion 300 are folded in the y-axis progressive folding station 146. An alternative method of manufacturing the bottle carrier may be to fold the front handle reinforcement portion 290 and the 300 in the x-axis progressive folding station 126. Adhesive applied to hold the front handle reinforcement portion 290 and the back handle reinforcement portion 300, such as the seventh front spine glue 468, the sixth front spine glue 470, the seventh handle glue 472 and the seventh right back glue 500 may be applied by angling the glue dispensers under the front handle reinforcement portion 290 and the back handle reinforcement portion 300. After applying the first y-direction glue strip 1100 and the second y-direction glue strip 1102, the front handle reinforcement portion 290 and the back handle reinforcement portion 300 may be attached in a similar manner as previously described.

Referring to FIG. 11, the erected carrier 190, formed according to the process described above, will have glue located on lines B-B which are substantially parallel to the spine fold line D-D. The first bottom glue area 502 on the front glue flap 264 is an preferred glue strip because it is parallel to an edge 265 on the front glue flap 264. The glue located on the first bottom glue area 502 is provided in order to attach the front glue flap 264 in a contiguous strip thereby creating a stronger joint. Also the glue located on the first bottom glue area 502 is sufficiently long in length and it is overall able to be applied in a controlled manner. The trailing end 70 (FIG. 2) is confined to a controlled location where it does not interfere wit the operation or aesthetics of the completed carrier 202. Referring to FIG. 9, on-the-other-hand, the glue located on the third right back glue area 484, the fourth right back glue area 486, the fifth right back glue area 488, and the sixth right back glue area 490 are perpendicular to an edge 205 of the back panel graphics 204. The glue located on the third right back glue area 484, the fourth right back glue area 486, the fifth right back glue area 488, and the sixth right back glue area 490 may have tail portions (shown as a tail portion 492 of the third right back glue area 484) overlying the back panel graphics 204. Since hot melt glue is often non-transparent, the presence of the tail portion 492 on the back panel graphics 204 may be considered to be a cosmetic flaw. Often the presence of a cosmetic flaw will render the erected carrier 190 unusable. A specific example of a functional defect may be that the tail portion 492 may cause functional problems when spanning over the right front glue flap fold line 328. Additionally, the tail portion 492 may attach the right front panel 230 to the right back panel 220, resulting in difficulty converting the completed package 202 to the erected container 190.

An additional example of the limitations of the prior art is that the glue applied to the eighth front spine glue area 482 may have a tail portion 494 resulting in difficulty erecting the completed package 202 into the erected container 190. When erecting the completed package 202, the tail portion 494 may inhibit the proper folding of the right front partition 246 and the right back partition 250. The right front partition 246 moves to a position that may be 90 degrees from the front spine 240. If the tail portion 494 is present, the right front partition 246 is attached to right back partition 250. Therefore erecting the completed package 202 may be limited by the tail portion 494 as the right front partition 246 moves away from the back spine 242. With the previous discussion, it can be readily appreciated that the location of glue is of the utmost importance.

In order to address the problems described above, conventional right angle gluing machines are operated at a reduced speed in order to attempt to more precisely control the location of the glue. This reduced speed results in lower throughput of the machine. In a manufacturing environment, throughput equates directly to the revenue and profitability of the business.

SUMMARY OF THE INVENTION

A method of making a paperboard container is disclosed. The method may include moving a blank in a first direction and moving the blank in a second direction. The second direction may be transverse to the first direction. The method may further include applying a first quantity of adhesive to a first area on the blank while the blank is moving in the first direction. After applying the first adhesive, folding the blank about at least one line. The method may further include applying a second quantity of adhesive to the blank after folding the blank and before moving the blank in a second direction.

Also disclosed is a method of applying adhesive to a blank. The method of applying adhesive may include moving the blank in a first direction and moving the blank in a second direction. The second direction may be transverse to the first direction. The method may further include stopping the blank from moving in the first direction and applying adhesive to the blank after the moving the blank in the first direction and before the moving the blank in the second direction.

Yet another disclosure is a method of making a container. The method of making a container may include providing an adhesive dispenser, moving a blank in a first direction, and moving the blank in second direction that may be transverse to the first direction. The method may further include applying a first quantity of adhesive to the blank with the adhesive dispenser while the blank may be moving in the first direction and applying a second quantity of adhesive to the blank with the adhesive dispenser while the blank may be moving in the second direction.

A ninety-degree adhesive application machine is also disclosed. The machine may include a first section extending in a first direction, a transfer assembly attached to the first section and a second section attached to the transfer assembly. The second section may be extending in a second direction that is transverse to the first direction. The machine may be further provided with at least one adhesive applicator attached to the transfer assembly.

A bottle carrier is also disclosed. The bottle carrier may be provided with a first half and a second half. The first half is foldingly attached to the second half about a spine fold line. The bottle carrier my be further provided with at least one extruded adhesive strip adhering the first half to the second half on an adhesive line, wherein the adhesive line may be transverse to the spine fold line.

DETAILED DESCRIPTION OF THE INVENTION

Figure 1:
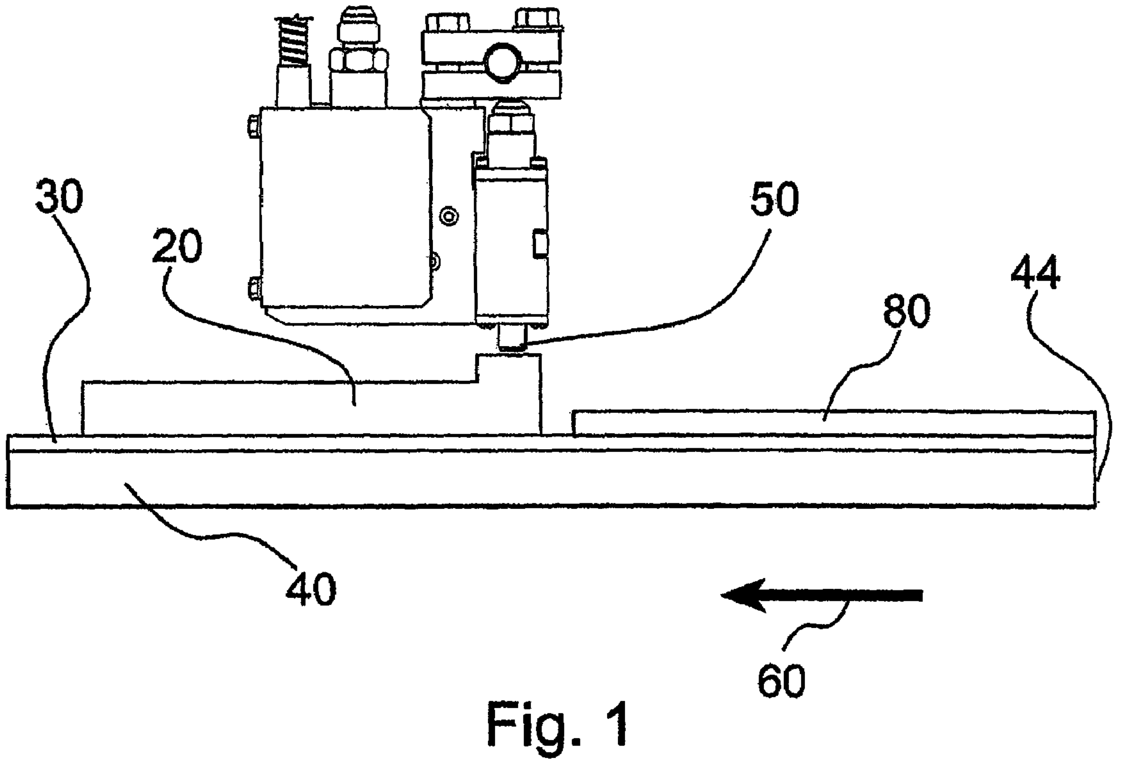
Fig. 1 PRIOR ART
FIG. 1 is a schematic view of a conventional hot glue nozzle in a glue dispensing condition.
Figure 2:
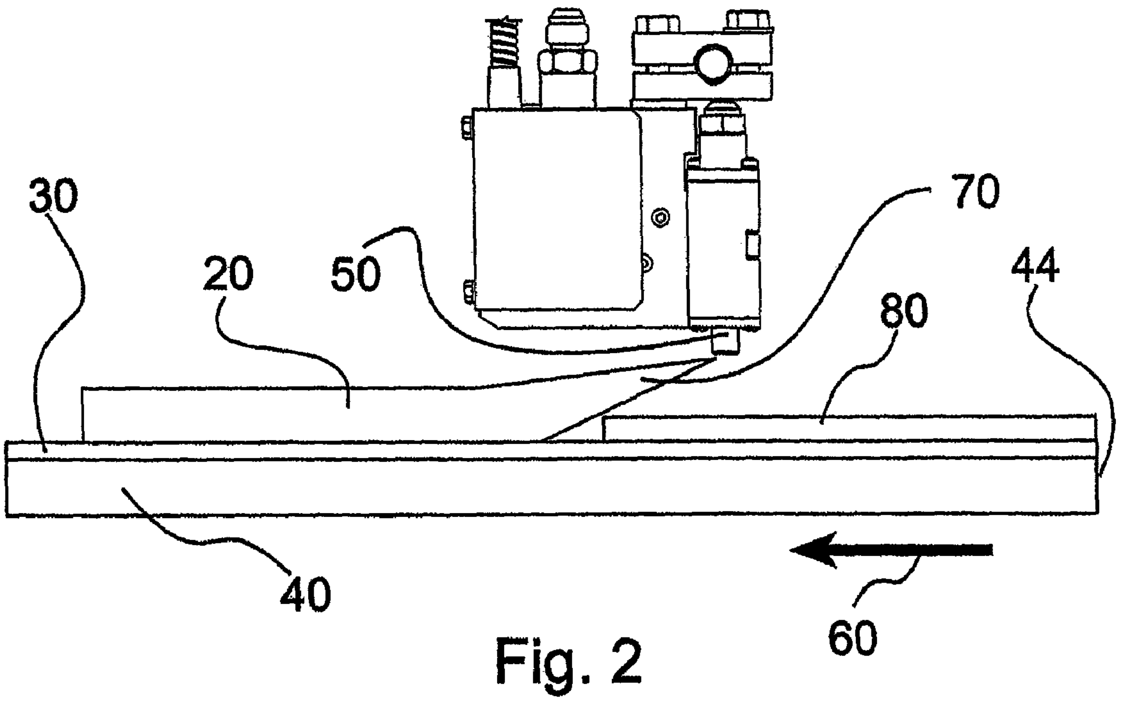
Fig. 2 PRIOR ART
FIG. 2 is a schematic view of the conventional hot glue nozzle in a post glue dispensing condition.
Figure 3:
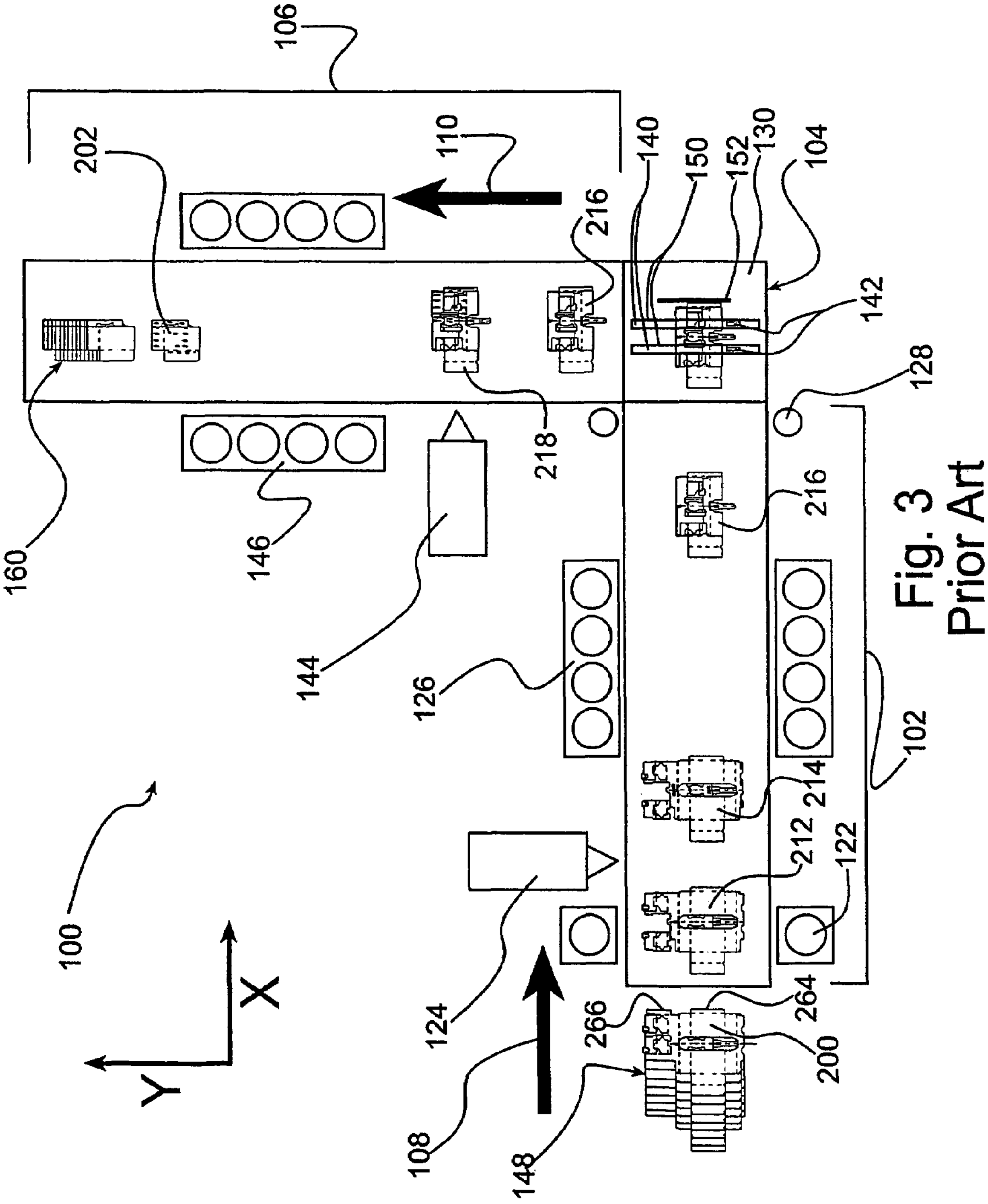
Fig. 3 Prior Art
FIG. 3 is a schematic view of a conventional right angle gluing machine.
Figure 12:
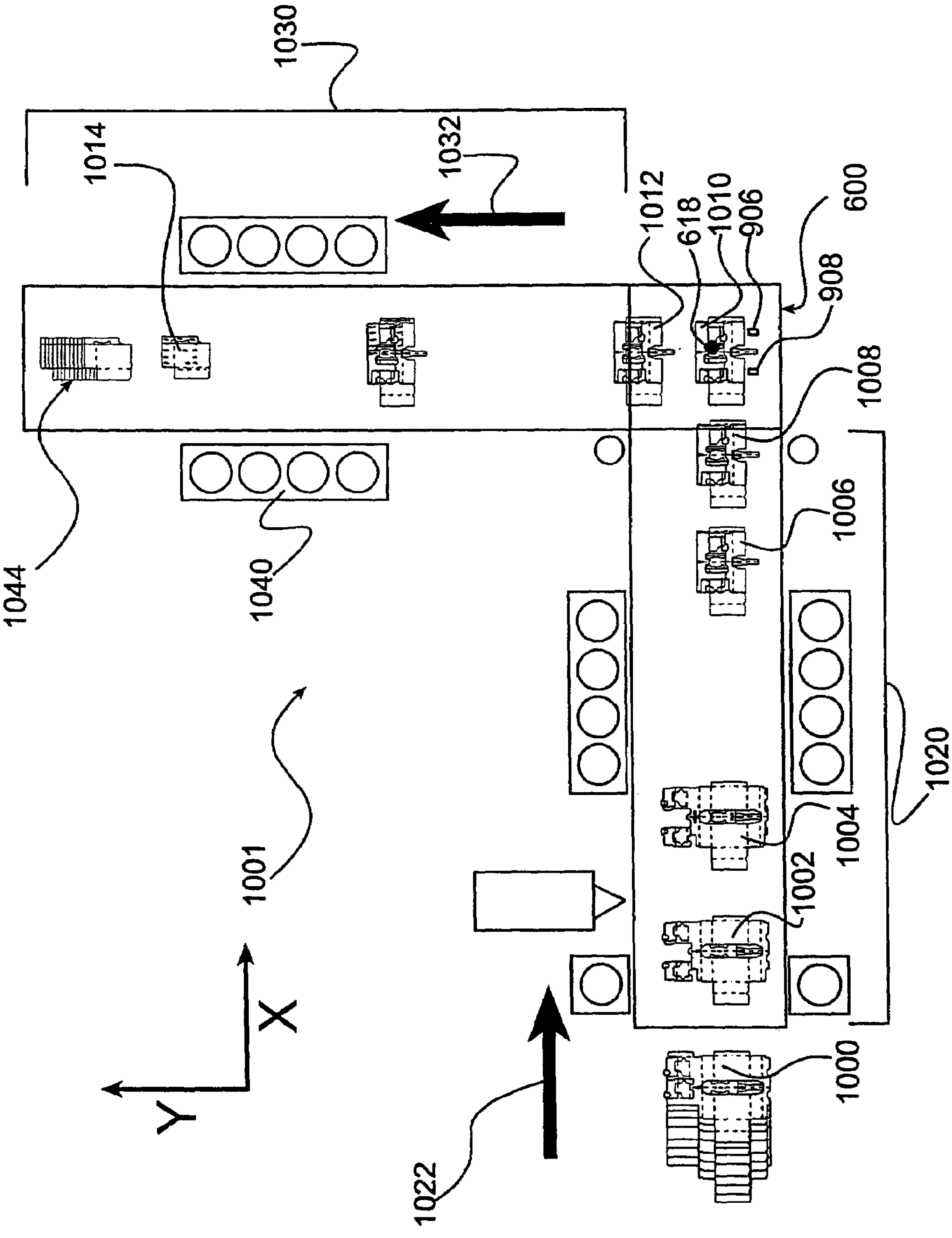
FIG. 12 is a schematic view of an improved right angle gluing machine.

Referring to FIG. 12, an improved right angle gluing machine 1001 may be provided with a transfer system 600. The transfer system 600 is provided to overcome the limitations of the conventional gluing machine 100 as described previously herein. The transfer system 600 replaces the conventional transfer system 104 of the conventional gluing machine 100 (FIG. 3).

The improved right angle gluing machine 1001 may be provided with an x-axis subsystem 1020, the transfer system 600 and a y-axis subsystem 1030. The x-axis subsystem 1020 and the y-axis subsystem 1030 of the improved right angle gluing machine 1001 may, for example, be, substantially similar to the conventional x-axis subsystem 102 and the conventional y-axis subsystem 106 of the conventional right angle gluing machine 100. One difference between the conventional y-axis subassembly 106 and the improved y-axis subassembly 1030 is be that the y-axis glue station 144 (FIG. 3) may be omitted in some circumstances.

Figure 13:
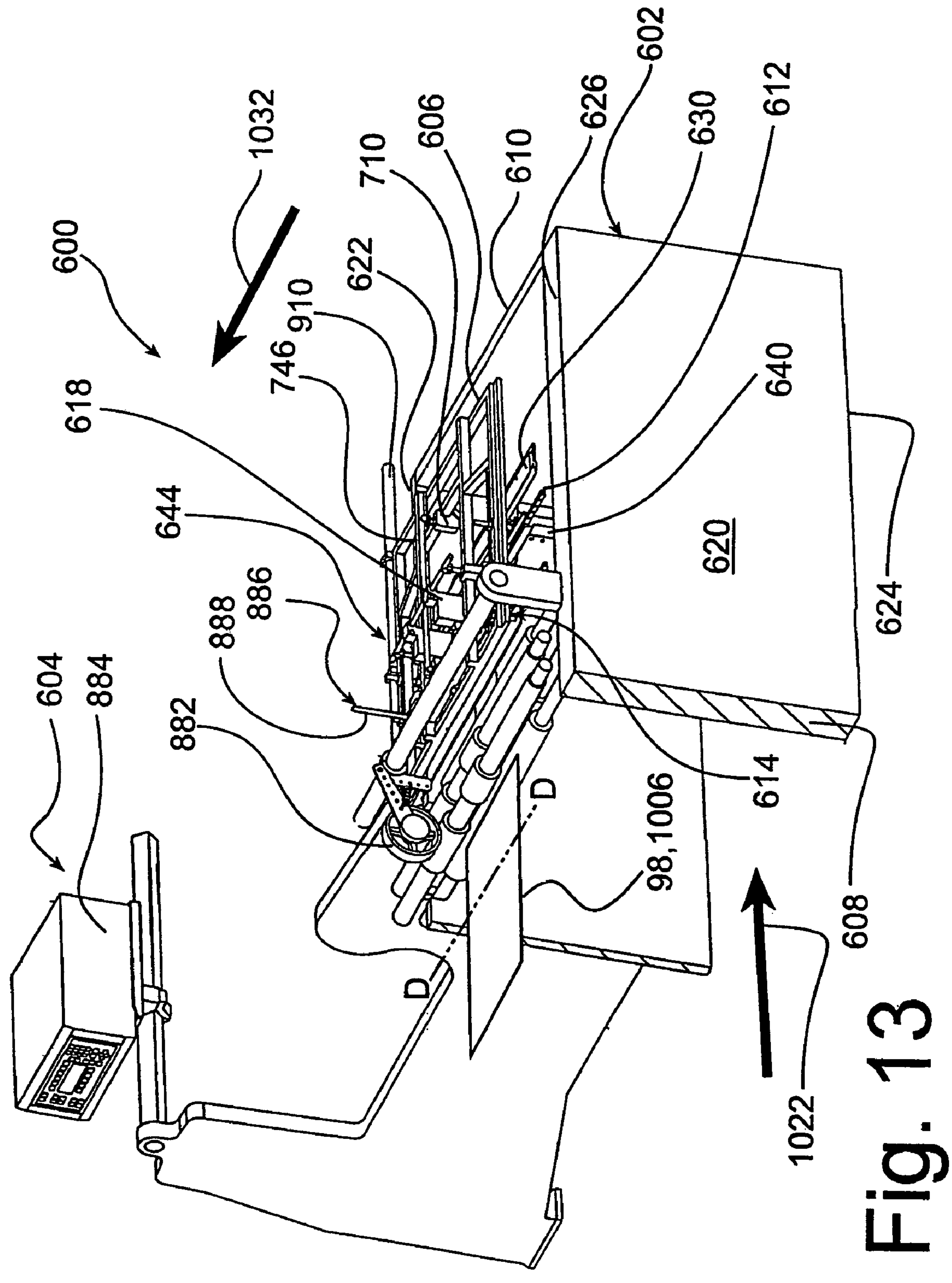
FIG. 13 is a perspective view of a transfer system of the right angle gluing machine of FIG. 12 in an operating condition.

Referring to FIG. 13, the transfer system 600 may be provided with a machine base 602, a frame 606, a cover assembly 614, a control system 604, a drive system 612 and a plurality of glue dispensers 618.

The machine base 602 may be provided with a base left side 608, a base right side 610, a base front side 620, a base back side 622, a base bottom 624, a base top 626, a platen 628 (FIG. 14), a V-stop 630, a right chain rack 640 (FIG. 14), a left chain rack 642 (FIG. 14) and a frame attachment member 644. The base left side 608, the base right side 610, the base front side 620 and the base back side 622 may be plate steel welded to substantially right-angle corners. The assembled base 602 may serve as the foundation upon which the frame 606 and the control system 604 are mounted.

Figure 14:
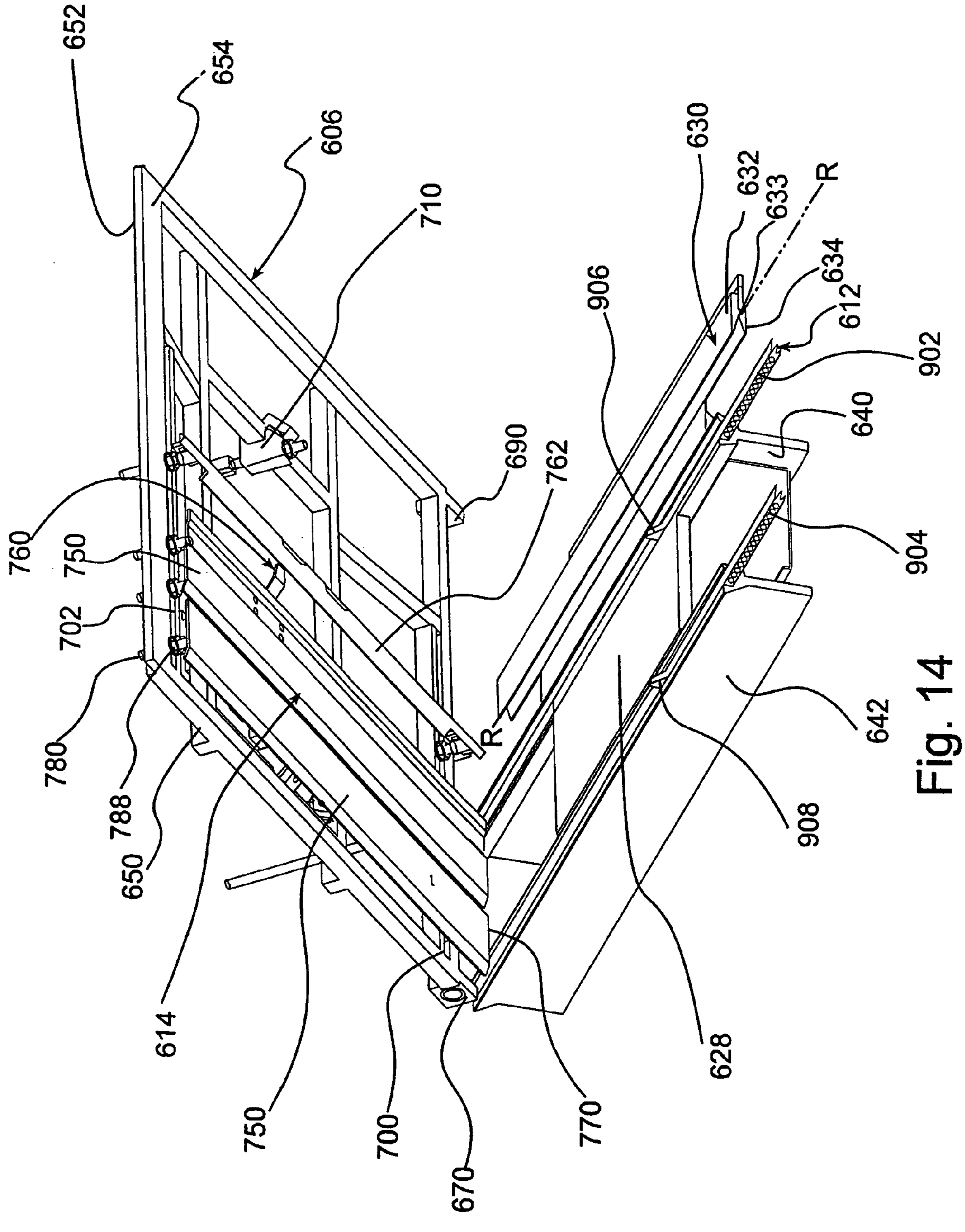
FIG. 14 is a perspective view of the transfer system of FIG. 13 in a cleaning condition.

Referring to FIG. 14, the right chain rack 640 and the left chain rack 642 may be attached to the base front side 620 (FIG. 13) and the base back side 622 (FIG. 13). The right chain rack 640 and the left chain rack 642 may be parallel to each other and parallel to the base left side 608 (FIG. 13) and the base right side 610 (FIG. 13). The right chain rack 640 and the left chain rack 642 may be provided near the base top 626 (FIG. 13). The platen 628 may be a substantially flat member attached to the right chain rack 640 and the left chain rack 642. The V-stop 630 may be attached to the right chain rack 640. The V-stop 630 may be provided with a top portion 632 and a bottom portion 634. The top portion 632 and the bottom portion 634 may have a V shaped profile forming a vertex 633. The vertex 633 may form a line R-R that is substantially parallel to the right chain rack 640 and the left chain rack 642.

Figure 15:
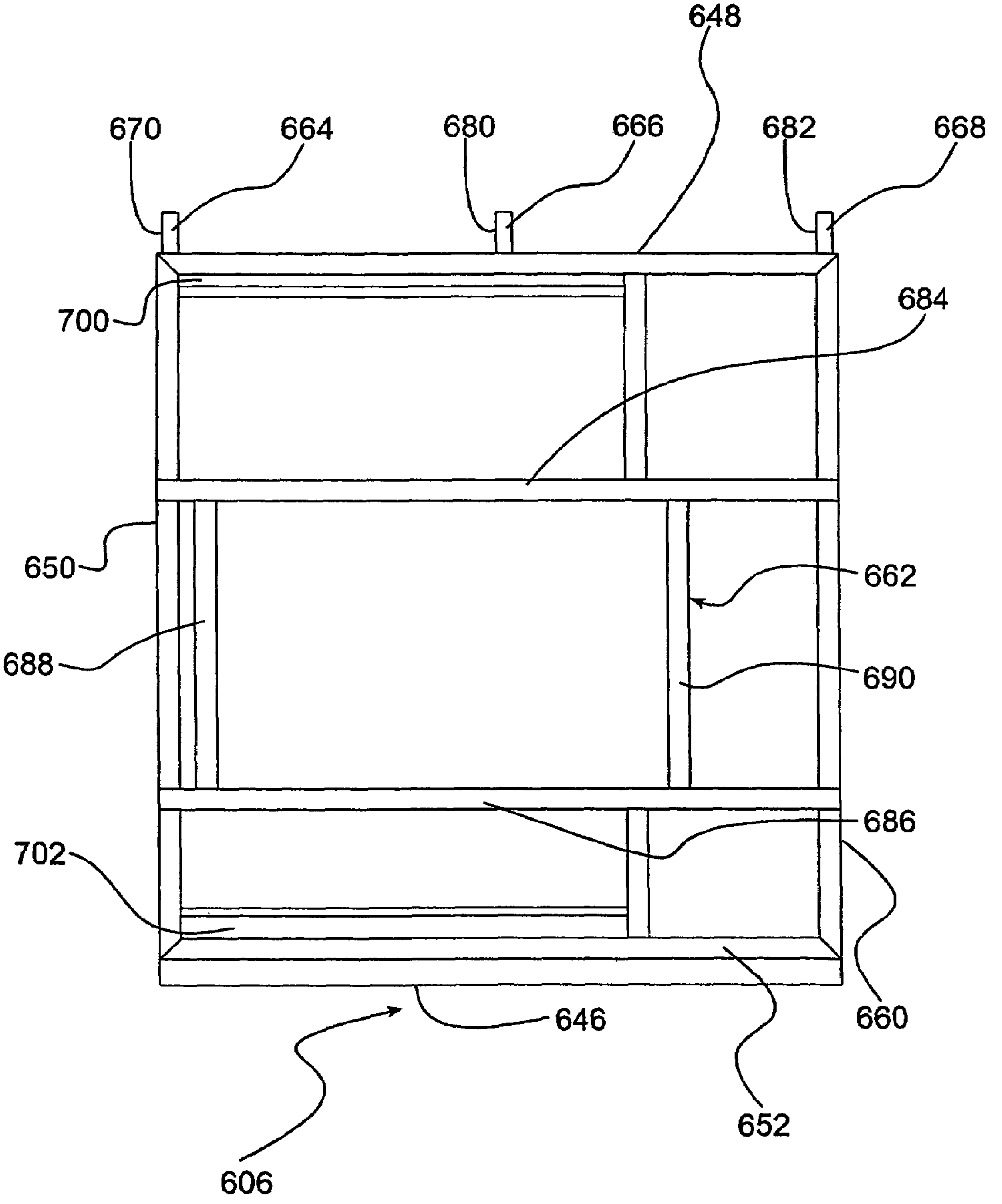
FIG. 15 is a top plan view of a frame of the transfer system of FIG. 13.

Referring to FIG. 15, the frame 606 may be provided with a frame front portion 646, a frame back portion 648, a frame left portion 650, a frame top portion 652, a frame bottom portion 654 (FIG. 14), a frame right portion 660 and a raised mount 662. The raised mount 662 may be provided with a back raised mount 684, a front raised mount 686, a left raised mount 688 and a right raised mount 690. The frame 606 may be further provided with a back cover slot 700 and a front cover slot front cover slot 702. The frame back portion 648 may be provided with a first pivot knuckle 664, a second pivot knuckle 666 and a third pivot knuckle 668. The first pivot knuckle 664, the second pivot knuckle 666 and the third pivot knuckle 668 may be provided with a first pivot hole 670, a second pivot hole 680 and a third pivot hole 682, respectively.

Figure 16:
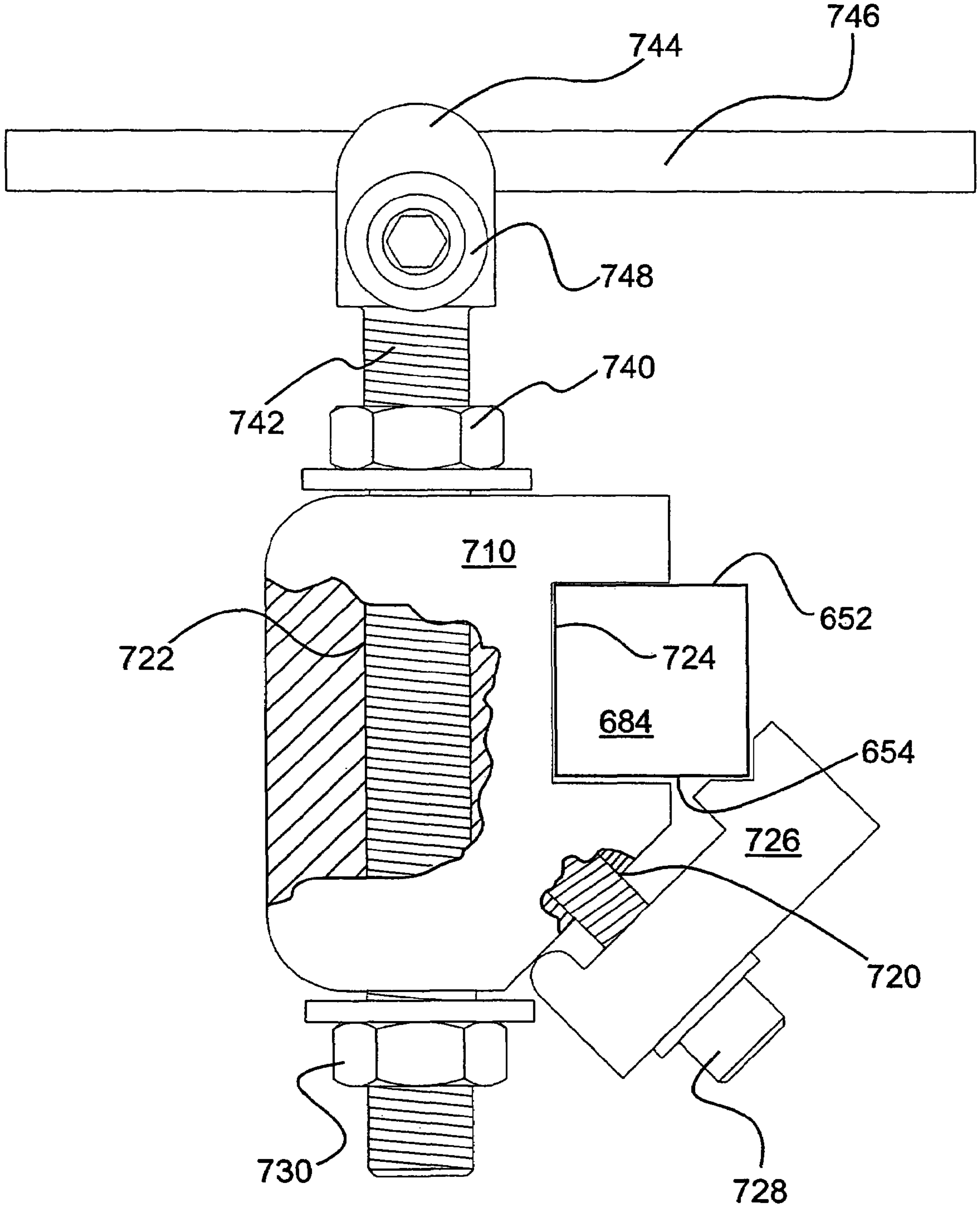
FIG. 16 is a partially broken-away side view of a frame clamp of the transfer system of FIG. 13.

Referring to FIG. 16, a frame clamp 710 may be provided for attaching the glue dispenser 618, the sensor assembly 886 or other equipment to the frame 606. The frame clamp 710 may be provided with a clamp bolt hole 720, a z-axis hole 722 and a frame groove 724. The frame clamp may be further provided with a clamp lever 726, a clamp bolt 728, a bottom z-axis nut 730, a top z-axis nut 740 and a z-axis adjuster bar 742. The z-axis adjuster bar 742 may be provided with a yoke 744 to receive a mounting bar 746.

Referring to FIG. 14, the cover assembly 614 may be provided with a transition cover 750, a cover finger 760 and a glue clearing cover 762.

Figure 17:
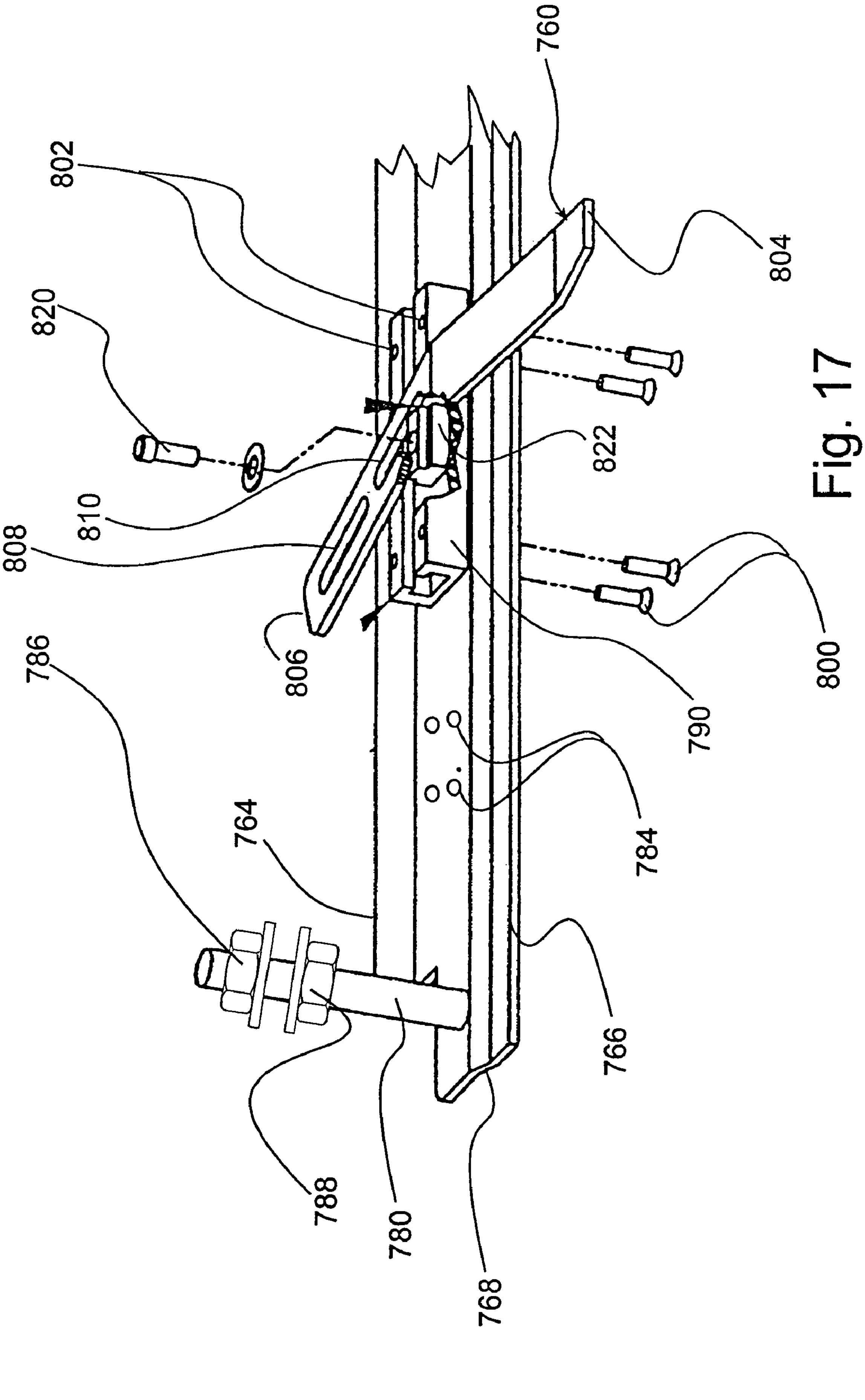
FIG. 17 is a perspective of a transition cover of the transfer system of FIG. 13.

Referring to FIG. 17, the transition cover 750 may be provided with a cover left portion 764, a cover right portion 766, a cover front portion 768, a cover back portion 770 (FIG. 14), a cover top portion 772, a cover bottom portion 774, a front cover z-axis adjustment rod 780, a back cover z-axis adjustment rod 782, a plurality of cover finger holes 784 and a cover finger track 790. The transition cover 750 may be a planar member provided with fold features parallel to the cover left portion 764 and the cover right portion 766. The cover front z-axis adjustment rod 780 may be provided on the cover top portion 772 near the cover front portion 768. The cover back z-axis adjustment rod 782 may be provided on the cover top portion 772 near the cover back portion 770. The cover front z-axis adjustment rod 780 and the cover back z-axis adjustment rod 782 may be threaded rod, each provided with a top cover z-axis adjustment nut 786 and a bottom cover z-axis adjustment nut 788. The cover finger track 790 may be attached with a plurality of finger bolts 800 through the cover finger holes 784. The finger bolts 800 pass through the cover finger holes 784 and thread into finger track threaded holes 802.

Referring still to FIG. 17, the cover finger 760 may be provided having a finger right portion 804, a finger left portion 806, a first finger slot 808 and a second finger slot 810. A finger mounting bolt 812 and a finger T-nut 814 may be provided to attach the cover finger 760 to the cover finger track 790.

Figure 18:
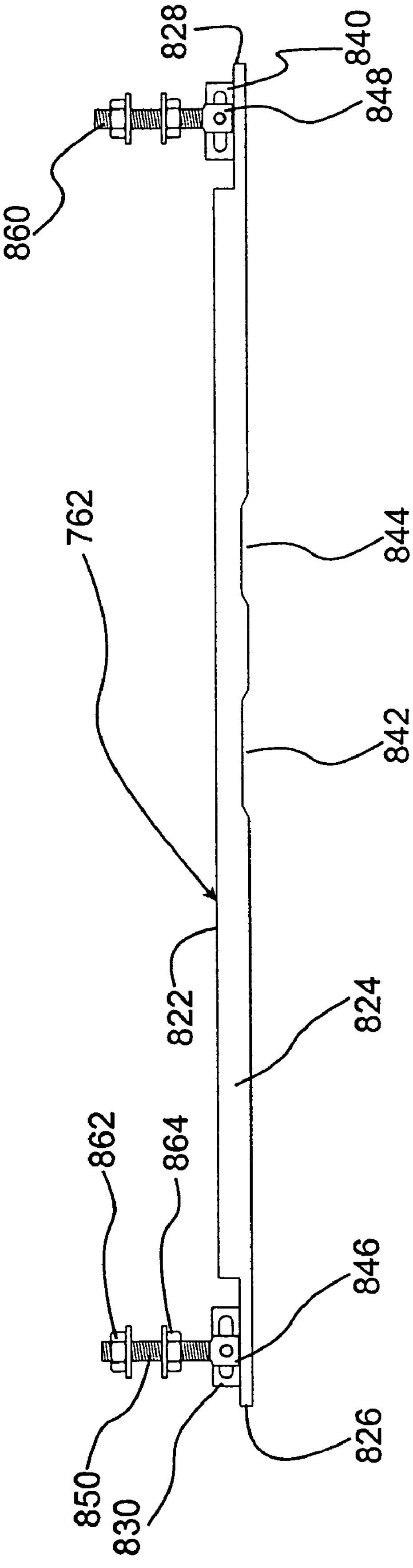
FIG. 18 is a side view of a glue spanning cover of the transfer system of FIG. 13.

Referring to FIG. 18, the glue spanning cover 762 may be provided with a glue spanning cover left portion 822, a glue spanning cover right portion 824, a glue spanning cover front portion 826, a glue spanning cover back portion 828, a front mounting slot member 830, a back mounting slot member 840, a first glue spanning opening 842 and a second glue spanning opening 844. Although the exemplary embodiment only shows the first glue spanning opening 842 and the second glue spanning opening 844, it is to be understood that more or fewer openings could be provided depending on the particular glue pattern to be applied. The front mounting slot member 830 may be provided on the glue spanning cover 762 near the glue spanning cover front portion 826. The back mounting slot member 840 may be provided on the glue spanning cover 762 near the glue spanning cover back portion 828. The front mounting slot member 830 and the back mounting slot member 840 may receive a front cover yoke 846 and a back cover yoke 848. The front cover yoke 846 and the back cover yoke 848 may be provided with a front z-axis adjuster bar 850 and a back z-axis adjuster bar 860. The front z-axis adjuster bar 850 and the back z-axis adjuster bar 860 may be threaded rod, each provided with a top z-axis adjuster nut 862 and a bottom z-axis adjuster nut 864.

Figure 19:
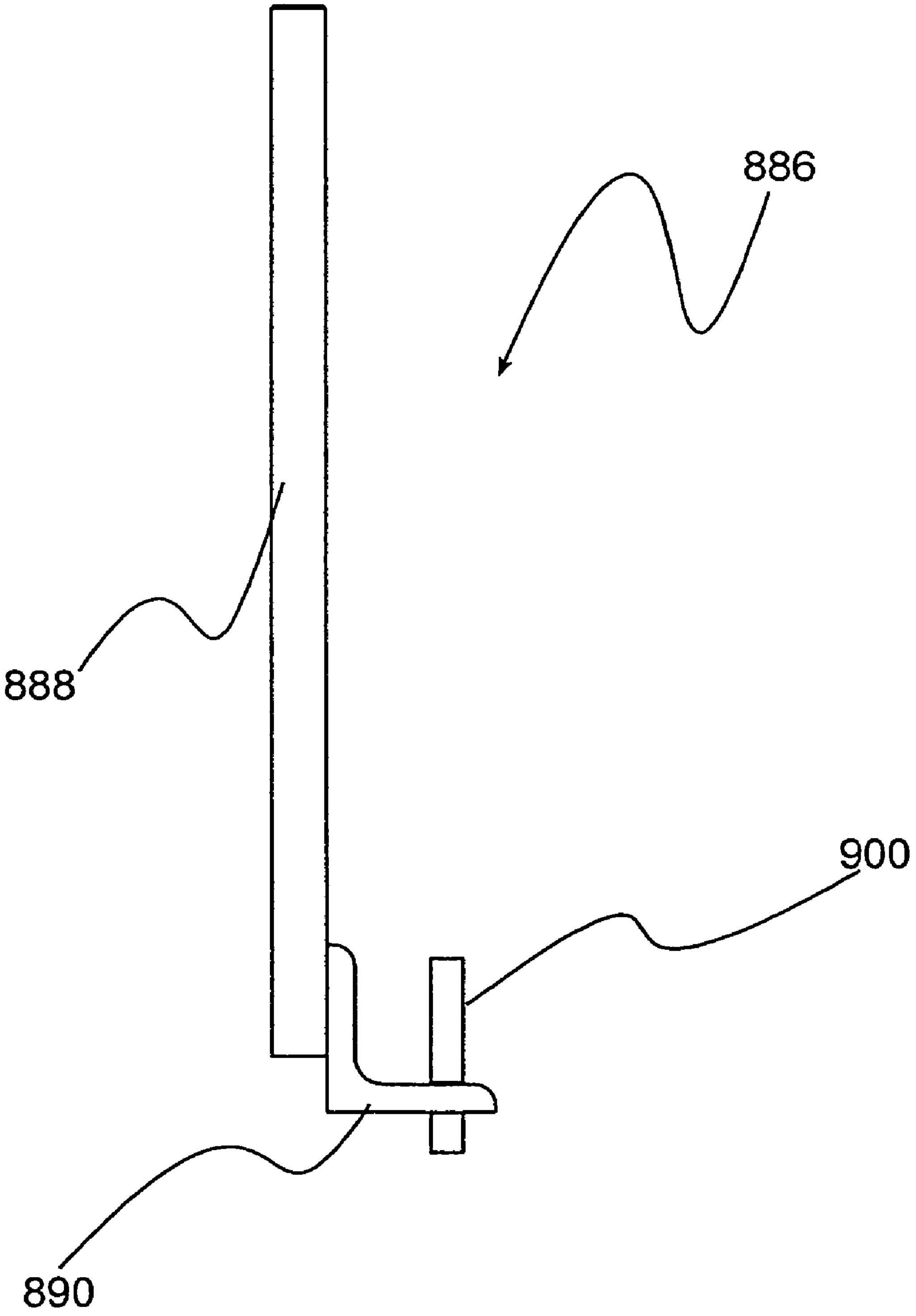
FIG. 19 is a side view of a sensor bracket of the transfer system of FIG. 13.

Referring to FIG. 13, the control system 604 may be provided with an encoder 882, a control computer 884 and a sensor assembly 886. The encoder 882 may be provided for sensing the speed at which the acceleration roll 128 is rotating. The encoder 882 provides information to the control computer 884, thereby providing feedback for controlling movement of blanks and forms down the x-axis subsystem 1020 and the y-axis subsystem 1030. Referring to FIG. 19, the sensor assembly 886 may be provided with a z-axis sensor rod 888, a sensor bracket 890 and a sensor 900. In the exemplary embodiment the sensor may, for example, be an optical sensor of the type manufactured by Valco Corporation of 411 Circle Freeway Drive in Cincinnati, Ohio under the model number 28OXX1O5. The control system 604 controls the dispensing of glue as detailed herein.

Referring to FIG. 14, the drive system 612 may be provided with a right drive chain 902, a left drive chain 904, a right lug 906, a left lug 908 and a drive motor (not shown). The right lug 906 may be provided on the right drive chain 902. The left lug 908 may be provided on the left drive chain 904. The left drive chain 904 may be provided on the left chain rack 642. The right drive chain 902 may be provided on the right chain rack 640. The orientation of the right drive chain 902 and the left drive chain 904 may permit the right lug 906 and the left lug 908 to protrude above the platen 628.

Figure 20:
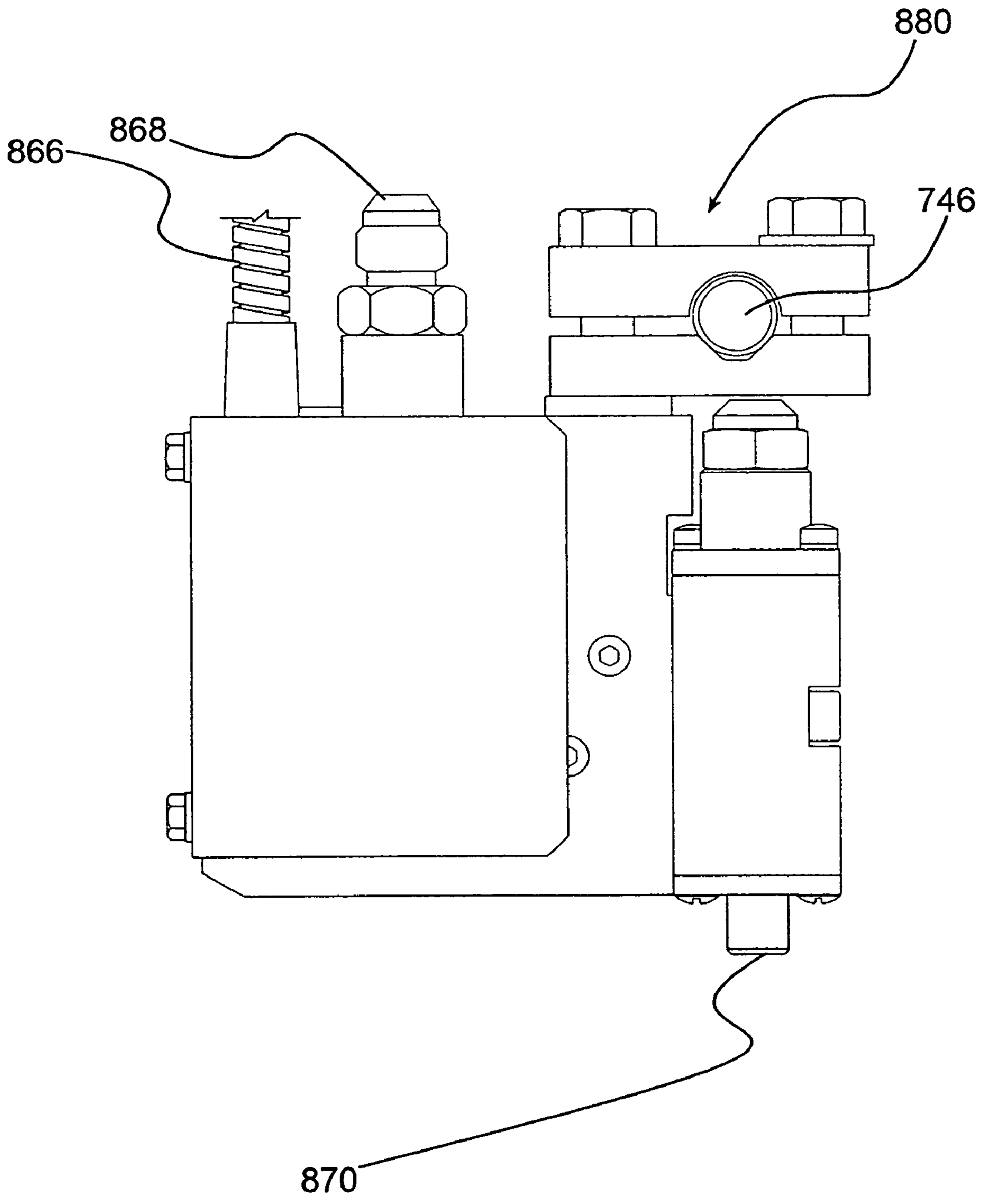
FIG. 20 is a perspective of a glue dispenser of the transfer system of FIG. 13.

Referring to FIG. 20, the glue dispenser 618 may be provided with a control interface 866, a glue delivery interface 868, a glue nozzle 870 and a glue gun mounting member 880. In the exemplary embodiment, the glue dispenser 618 may, for example, be of the type commercially available from Nordson Corporation at 11475 Lakefield Drive in Duluth, Ga. under the model number 326-540 H441-T for a single nozzle and number 725-814 H402-T-F-RH for a dual nozzle. Glue may be delivered to the glue dispenser 618 through the glue delivery interface 868. The control interface 866 controls the dispensing of glue from the glue nozzle 870. The entire glue dispenser 618 may be heated to bring the hot glue to a temperature at which it is semi-fluid.

Referring to FIG. 13, the transfer system 600 may be configured such that the base front side 620 and the base back side 622 are parallel to the x-axis direction 1022. The base left side 608 and the base right side 610 may be relatively parallel to the y-axis direction 1032. The frame 606 may be pivotally attached to the machine base 602 by a pivot shaft 910. The pivot shaft 910 may be captured by the first pivot knuckle 664, the second pivot knuckle 666 and the frame back portion 648 through the first pivot hole 670, the second pivot hole 680 and the third pivot hole 682, respectively. The captured pivot shaft 910 may be further captured by the frame attachment member 644. The frame may be pivoted about the pivot shaft 910 for clearing if the transfer system 600 becomes jammed.

Referring to FIG. 14, the frame 606 may be provided with one or more of the transition cover 750 and one or more of the glue spanning cover 762. The transition cover 750 may be provided on the frame bottom portion 654 near the frame left portion 650. The cover front z-axis adjustment rod 780 may be located in the front cover slot 702 with the bottom cover z-axis adjustment nut 788 provided on the frame bottom portion 654 and the top cover z-axis adjustment nut 786 (not shown in FIG. 14, shown in FIG. 17) provided on the frame top portion 652. The cover back z-axis adjustment rod 782 (not shown in FIG. 14, shown in FIG. 17) may be provided in the back cover slot 700 with another bottom cover z-axis adjustment nut 788 provided on the frame bottom portion 654 and another top cover z-axis adjustment nut 786 provided on the frame top portion 652. The transition cover 750 may be adjusted such that a predetermined space exists between the transition cover 750 and the platen 628.

Referring to FIG. 17, the cover finger 760 may be provided on the transition cover 750 for providing additional force to urge the blank 200 against the platen 628. The cover finger 760 may be adjusted by loosening the finger mounting bolt 812 and utilizing either the first finger slot 808 or the second finger slot 810 to change the location of the finger right portion 804. The glue spanning cover 762 may be attached to the frame 606 by positioning the front z-axis adjuster bar 850 through the front cover slot 702 (FIG. 15) and positioning the back z-axis adjuster bar 860 through the back cover slot 700 (FIG. 15). The front z-axis adjuster bar 850 and the back z-axis adjuster bar 860 may be attached to the frame 606 by the bottom z-axis adjuster nut 864 and the top z-axis adjuster nut 862. The top z-axis adjuster nut 862 may apply force to the frame top portion 652 while the bottom z-axis adjuster nut 864 may apply force to the frame bottom portion 654 of the frame 606, thereby securing the glue spanning cover 762 to the frame 606.

As shown in FIG. 13, a plurality of the frame clamp 710 may be clamped to the members of the raised mount 662. The members of the raised mount 662 may be the back raised mount 684, the right raised mount 690, the front raised mount 686 and the left raised mount 688. Although the frame clamp 710 may be attached to any member of the raised mount 662, only the attachment to the back raised mount 684 will be described in detail. Referring to FIG. 16, the frame clamp 710 may be positioned on the frame top portion 652 of the back raised mount 684. The clamp lever 726 may be positioned on the frame bottom portion 654 of the back raised mount 684. The clamp bolt 728 may be tightened thereby advancing into the clamp bolt hole 720. The tightening of the clamp bolt 728 may secure the frame clamp 710 to the back raised mount 684. The z-axis adjuster bar 742 may be positioned at a predetermined height and secured by tightening the top z-axis nut 740 and the bottom z-axis nut 730. The tightening of the top z-axis nut 740 and the bottom z-axis nut 730 captures the z-axis adjuster bar 742 in the z-axis hole 722. The yoke 744 may be aligned to receive a mounting bar 746. A yoke fastener 745 may be tightened to capture the mounting bar 746. A second frame clamp may be provided on the front raised mount 686 in a substantially similar manner as the frame clamp 710 mounted to the back raised mount 684. The mounting bar 746 may be captured by a second yoke 744, thereby attaching the mounting bar 746 to the frame 606.

A plurality of glue dispensers such as the glue dispenser 618, FIG. 20, may be attached to the mounting bar 746. The glue gun mounting member 880 may be tightened to the mounting bar 746 at a predetermined position. The quantity and location of the glue dispenser 618 may be determined by the particular article to be manufactured. The control interface 866 may be connected to the control computer 884 for controlling the dispensing of glue from the glue nozzle 870.

Although a detailed exemplary description of the operation of the improved right angle gluing machine 1001 will be provided herein, a brief introduction will now be set forth. Referring to FIG. 13, an exemplary blank 98 may travel in the x-axis direction 1022 down the x-axis subsystem 1020 (FIG. 12) and enter into the transfer assembly transfer assembly 600. The encoder 882 senses the speed of the exemplary blank 98 and may provide information to the control computer 884. The exemplary blank 98 progresses into the transfer assembly 600 until it is stopped by the V-stop 630. The exemplary blank 98 is stationary for a predetermined amount of time until the right lug 906 (FIG. 14) and the left lug 908 (FIG. 14) contact the exemplary blank 98. The contact of the right lug 906 and the left lug 908 redirects the exemplary blank 98 to move in the y-axis direction 1032. The exemplary blank 98 travels out of the transfer assembly 600 in the y-axis direction 1032 and is introduced to the y-axis subsystem 1030 (FIG. 12). While exemplary blank 98 is located in the transfer assembly 600, glue may be applied from the glue dispenser 618 onto exemplary blank 98.

Figure 21:
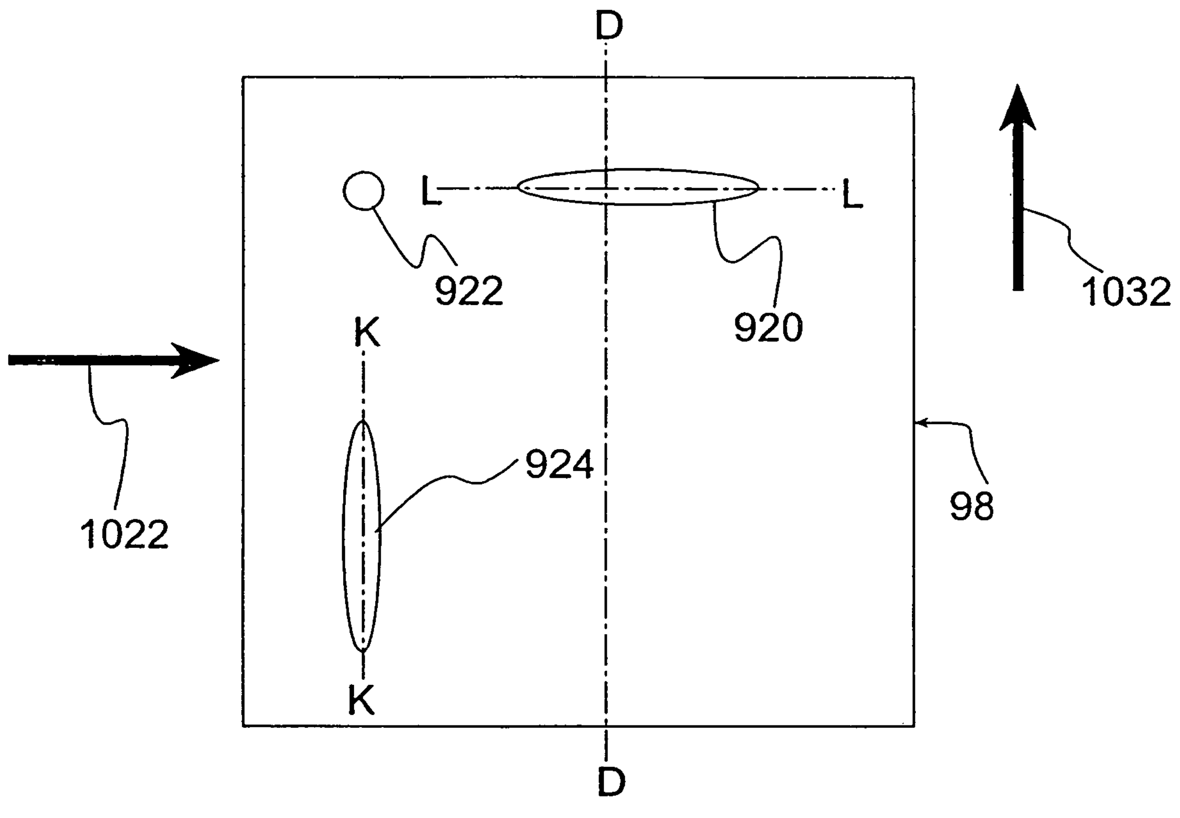
FIG. 21 is a top view of an exemplary carton blank.

Referring to FIG. 21, the glue may be oriented on exemplary blank 98 in three orientations: a first glue orientation 920, a second glue orientation 922 and/or a third glue orientation 924. The first glue orientation 920 may be applied by the glue nozzle 618 (FIG. 13) when the exemplary blank 98 is traveling in the x-axis direction 1022, just prior to contacting the V-stop 630. In the first glue orientation 920, a first configuration line L-L may be perpendicular to the spine fold line D-D.

The second glue orientation 922 may have a substantially circular geometry and may be applied while the exemplary blank 98 is stationary. The stationary period may commence when the exemplary blank 98 contacts the V-stop 630 (FIG. 13) and may terminate when the right lug 906 (FIG. 13) and the left lug 908 (FIG. 13) contact the exemplary blank 98.

The third glue orientation 924 may be applied by the glue nozzle 870 (FIG. 20) after the exemplary blank 98 begins moving in the y-axis direction 1032. In the third glue configuration 924, a third configuration line K-K may be parallel to the spine fold line D-D.

It can be appreciated by those skilled in the art that the first and third glue configuration 920, 924 may be combined to create an L-Shaped pattern. The L-Shaped pattern may be positioned with a portion on the line L-L and another portion on line K-K and sharing a common vertex.

As discussed above, the first glue orientation 920 is applied while the blank 98 is moving in the x-axis direction 1022. The first glue spanning opening 842 (FIG. 18) and/or the second glue spanning opening 844 (FIG. 18) may be provided to avoid contact between the first glue orientation 920 and the glue area spanning cover 762 and, thus, avoiding an undesirable buildup of glue on the glue spanning cover 762. Additionally, glue that would be undesirably collected on the glue spanning cover 762 would degrade the visual and mechanical qualities of a completed package.

Having provided detailed descriptions of the individual components and a brief description of their operation, a detailed description of operation will now be provided. It is important to reiterate that a specific bottle carrier design is described herein for exemplary purposes only and that the actual box or carton constructed by the machine 1001 described herein may, alternatively, be of any geometry, made of any material or may otherwise deviate from the exemplary description provided.

Figure 22:
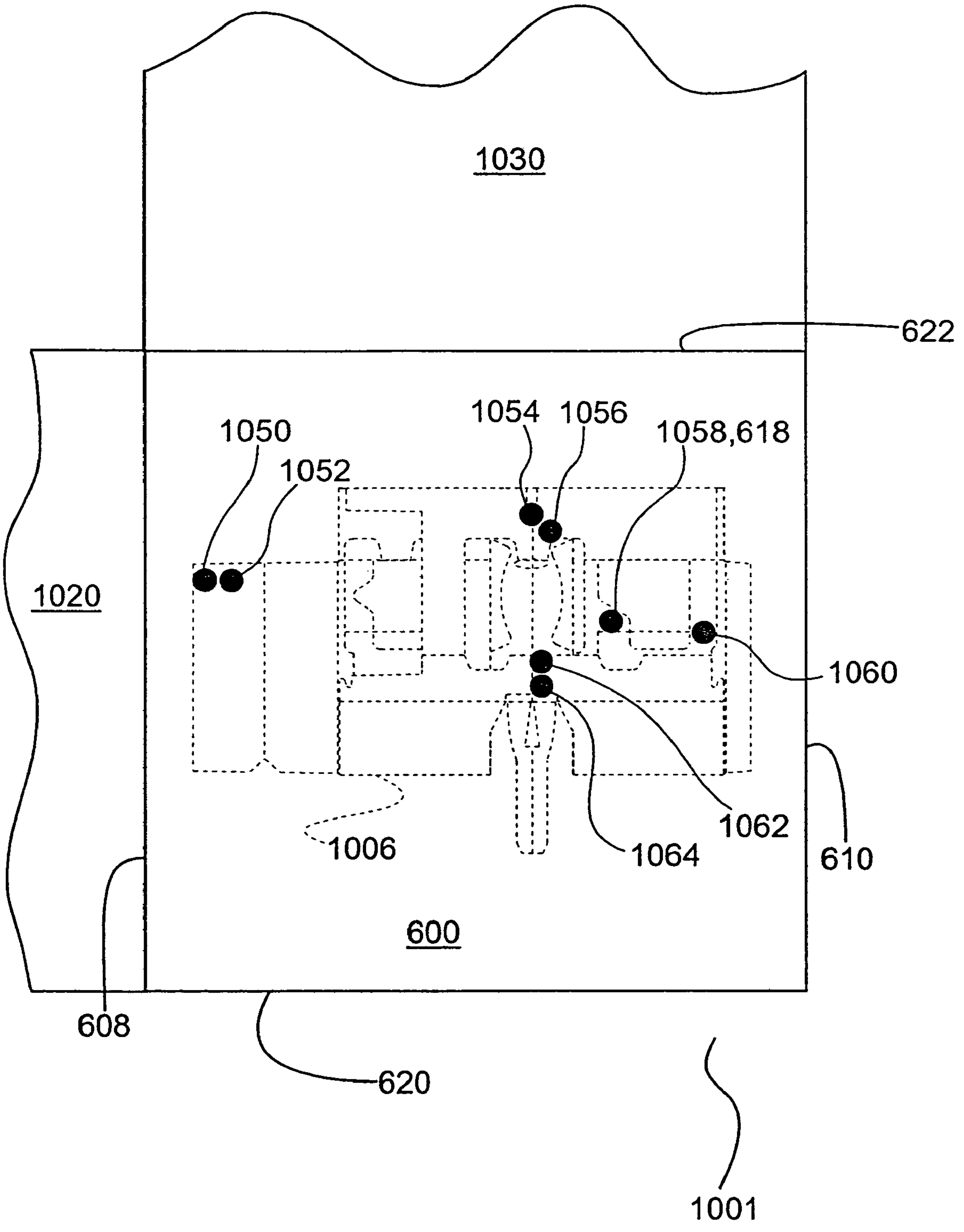
FIG. 22 is a schematic top view of an exemplary transfer system configuration of the improved right angle gluing machine of FIG. 13.

Referring to FIG. 22, the transfer system 600 may be provided with a plurality of glue dispensers such as the glue dispenser 618 to create a predetermined glue pattern. In an exemplary configuration, the transfer system 600 may be provided with eight of the glue dispensers 618. Each individual glue dispenser 618 will be identified for clarity purposes. A first glue dispenser 1050, a second glue dispenser 1052, a third glue dispenser 1054, a fourth glue dispenser

1056, a fifth glue dispenser 1058, a sixth glue dispenser 1060, a seventh glue dispenser 1062 and a eighth glue dispenser 1064 may be provided to dispense glue on a blank (for example the third intermediate form 1006). The first glue dispenser 1050, the second glue dispenser 1052, the third glue dispenser 1054, the fourth glue dispenser 1056, the fifth glue dispenser 1058, the sixth glue dispenser 1060, the seventh glue dispenser 1062 and the eighth glue dispenser 1064 may be mounted to various mounting bars 746, as previously described.

Figure 23A:
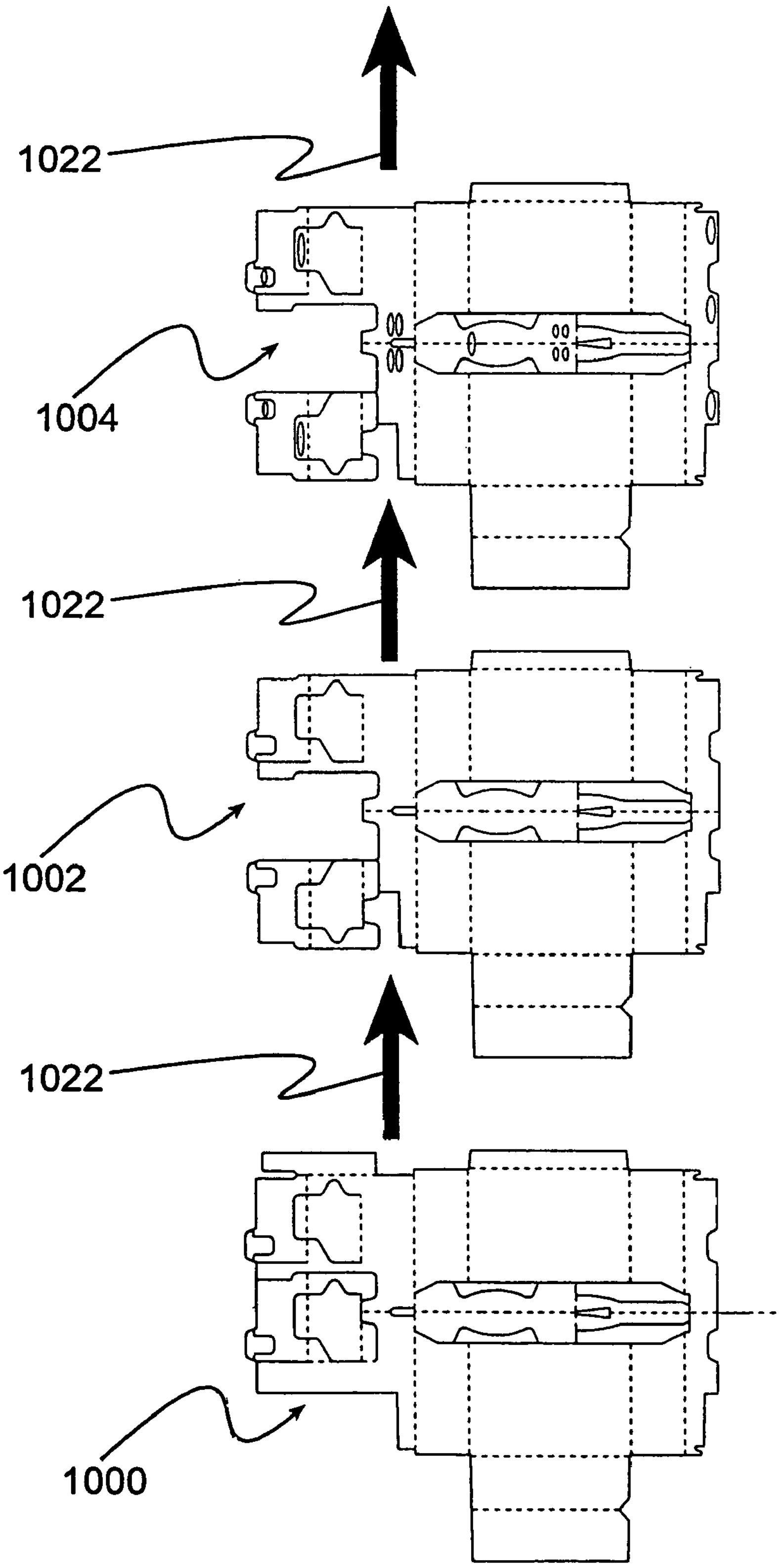
FIGS. 23A and 23B are a schematic view of a conversion from a blank into a completed package using the improved right angle gluing machine of FIG. 13.
Figure 23B:
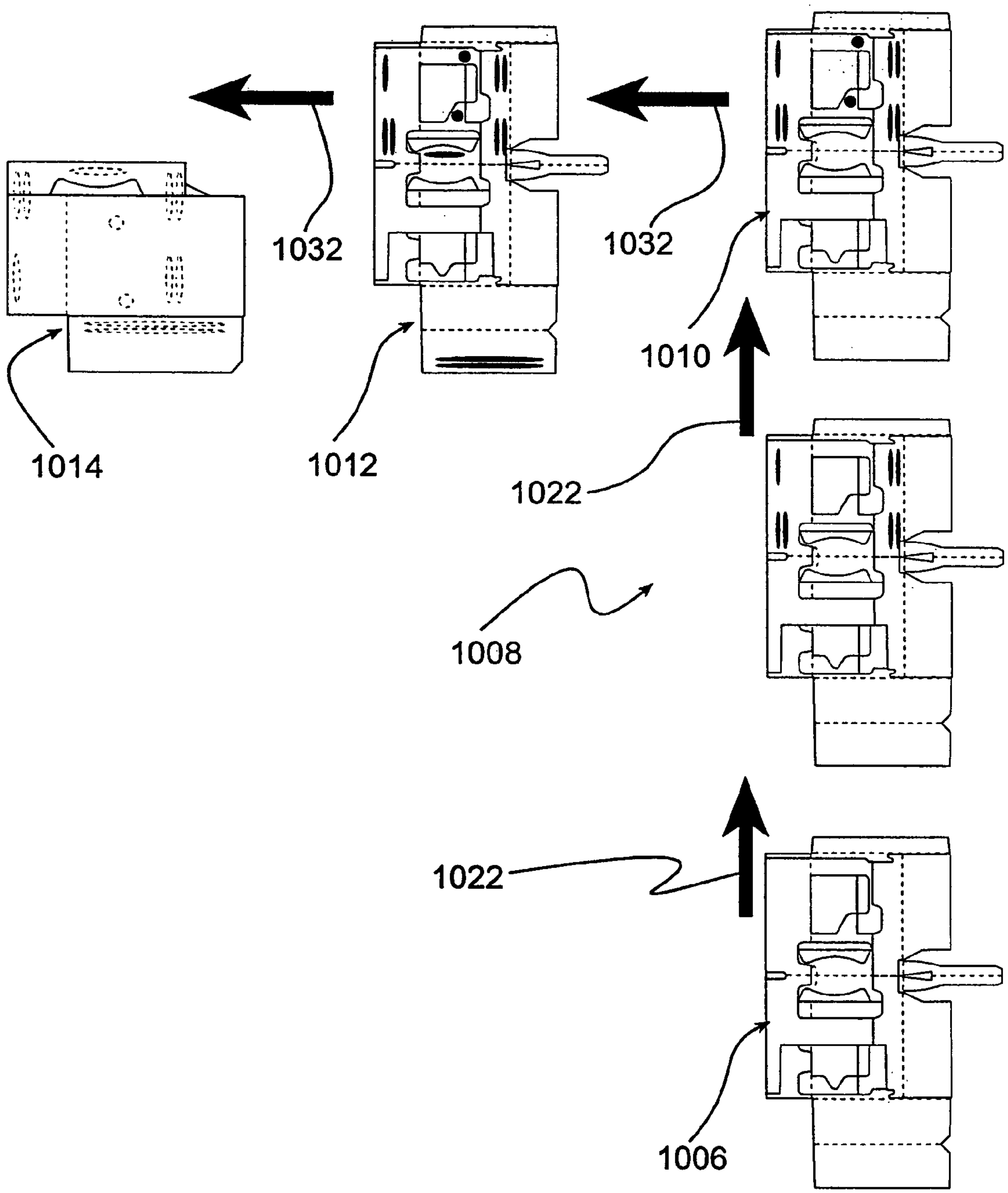

Referring to FIGS. 23A and 23B, a blank 1000 may be converted into a first intermediate form 1002. The first intermediate form 1002 is converted into a second intermediate form 1004. The second intermediate form 1004 is converted into a third intermediate form 1006. The third intermediate form 1006 is converted into a fourth intermediate form 1008. The fourth intermediate form 1008 is converted into a fifth intermediate form 1010. The fifth intermediate form 1010 is converted into a sixth intermediate form 1012. The sixth intermediate form 1012 is converted into a completed carrier 1014.

Figure 4:
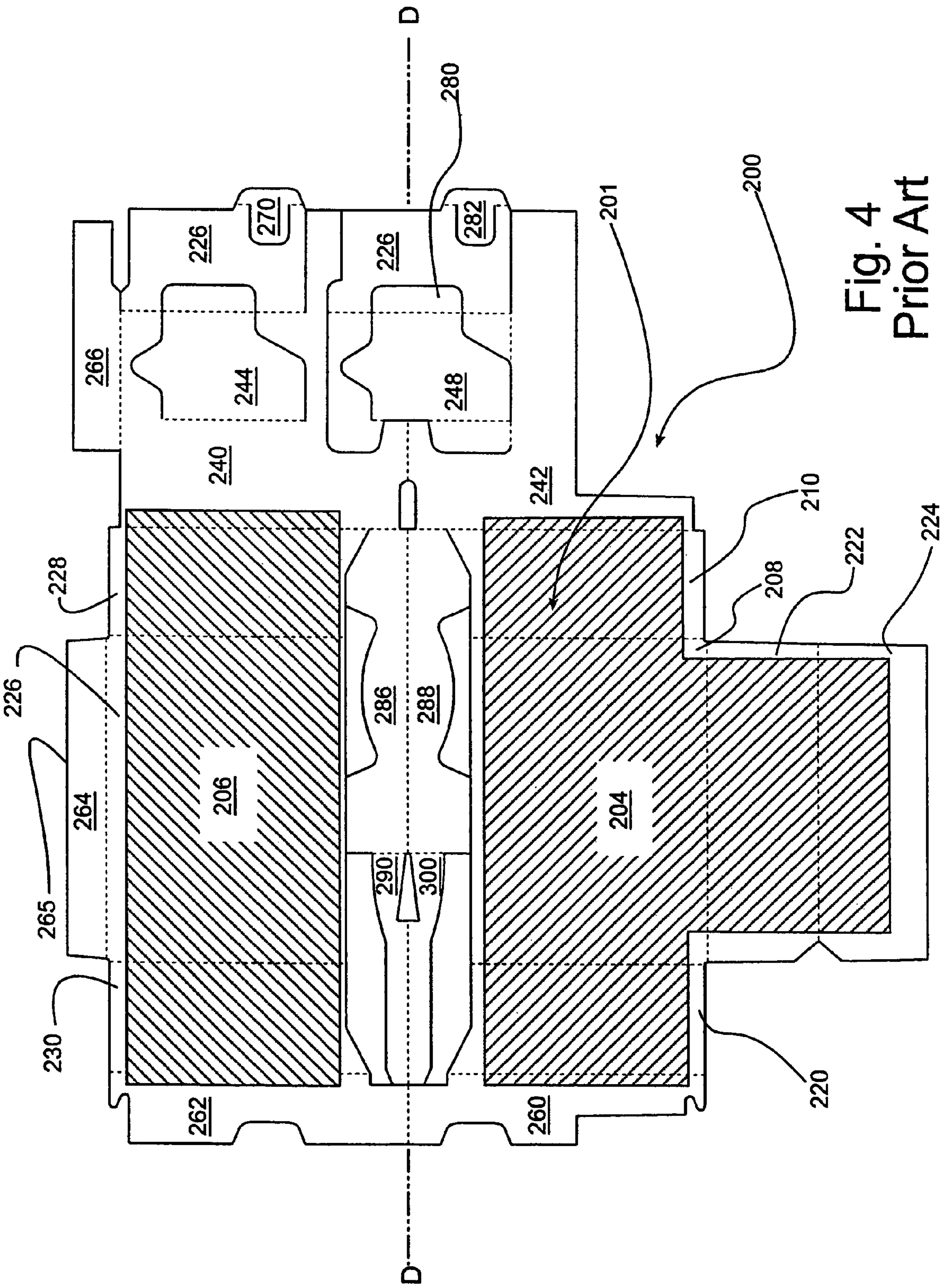
Fig. 4 Prior Art
FIG. 4 is a top view of a laminate film side of a conventional carton blank.
Figure 5:
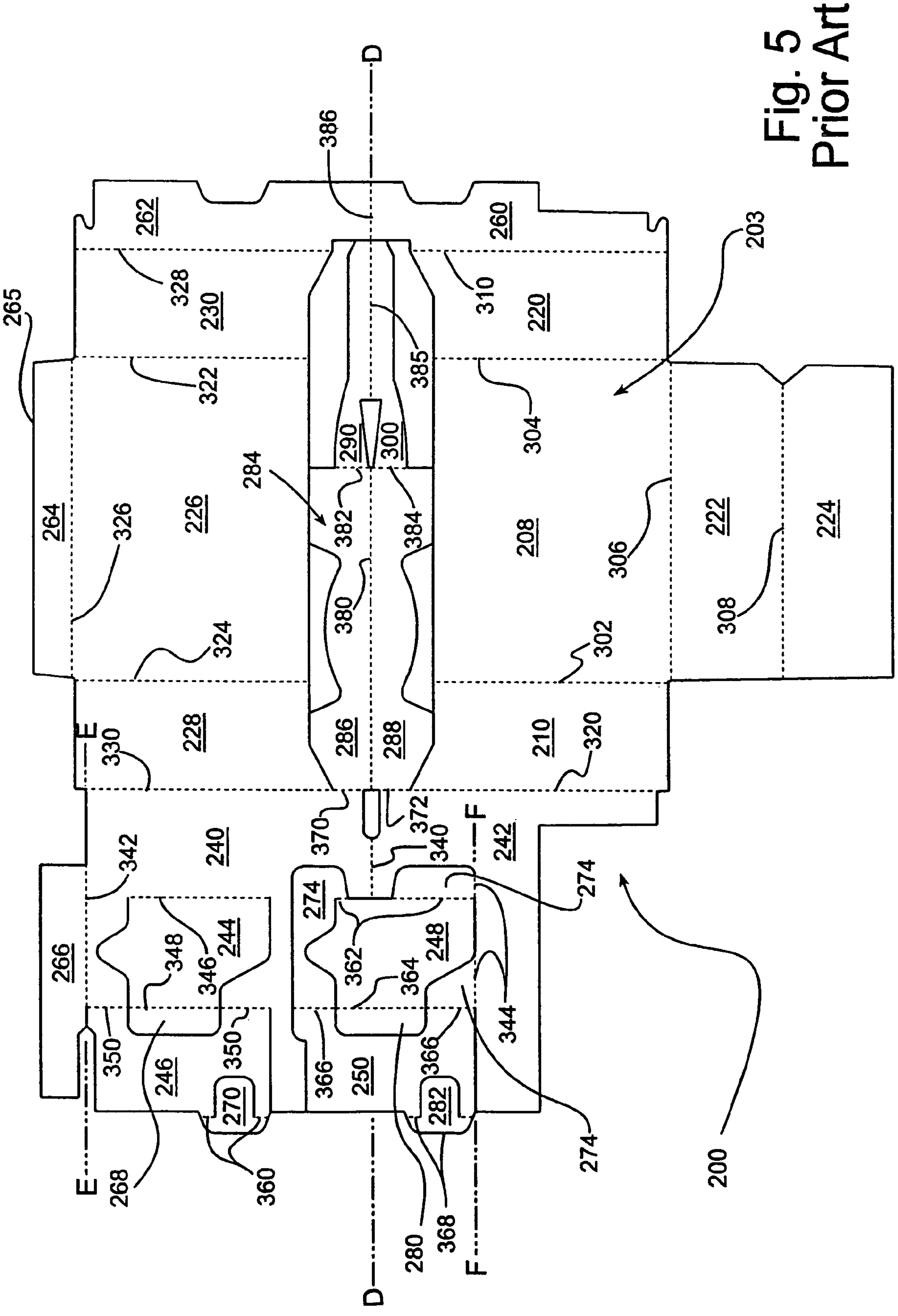
Fig. 5 Prior Art
FIG. 5 is a top view of a paperboard side of the conventional carton blank of FIG. 4.
Figure 6:
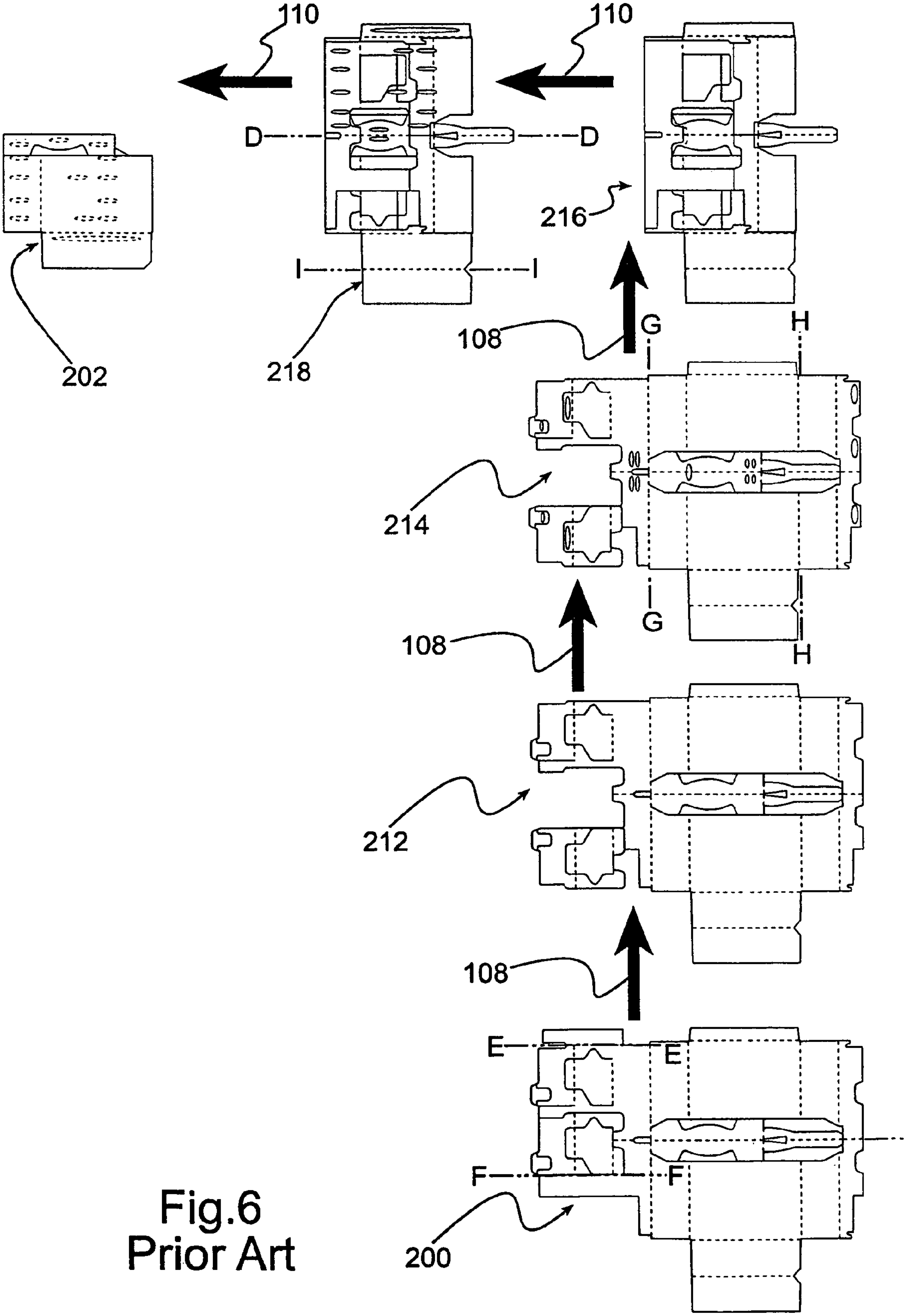
Fig.6 Prior Art
FIG. 6 is a schematic view of a conventional process used to convert the conventional carton blank of FIGS. 4 and 5 into a completed package.
Figure 7:
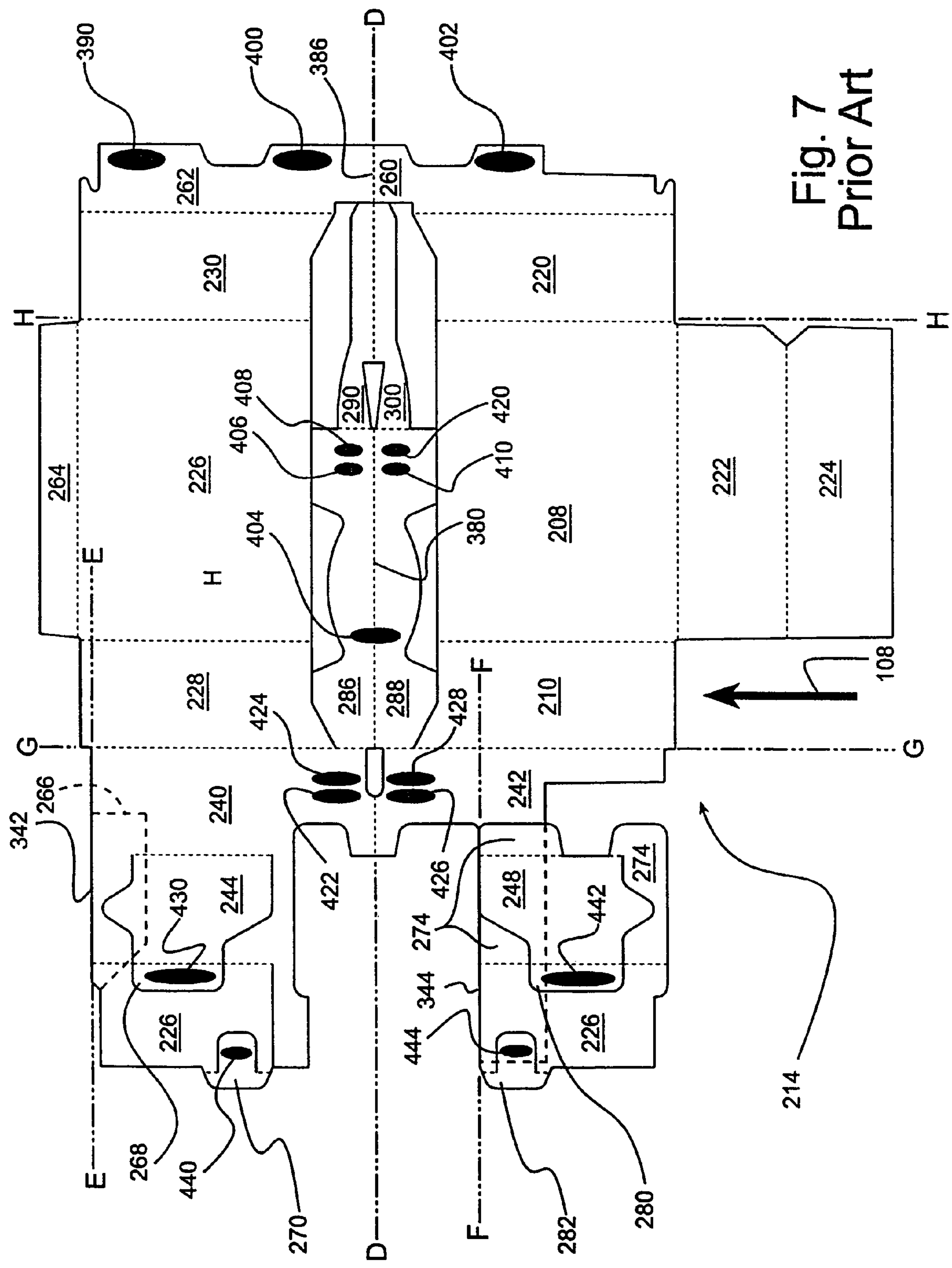
Fig. 7 Prior Art
FIG. 7 is a top view of a second intermediate form of the conventional carton blank of FIGS. 4 and 5.
Figure 8:
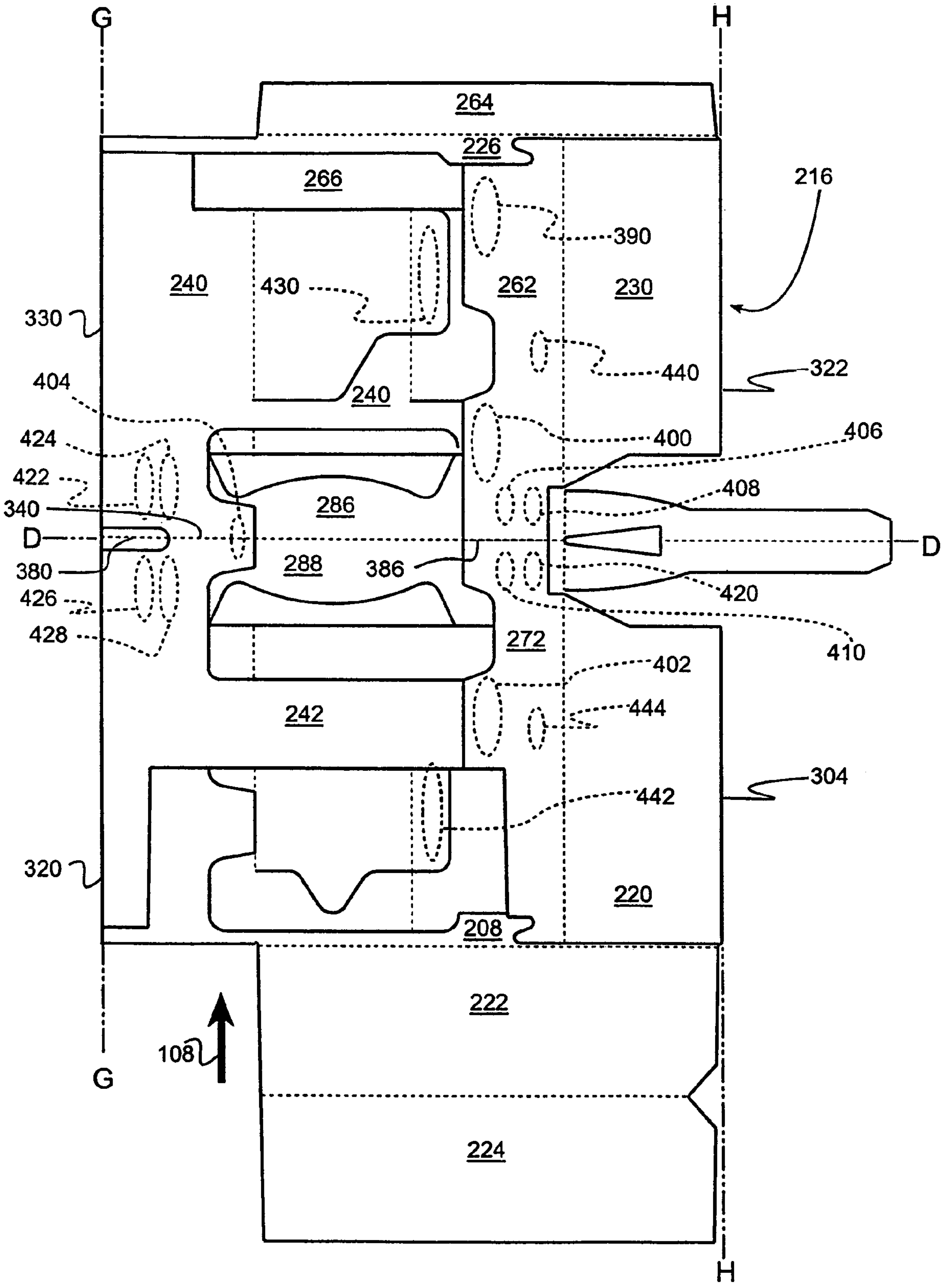
Fig. 8 Prior Art
FIG. 8 is a top view of a third intermediate form of the conventional carton blank of FIGS. 4 and 5.
Figure 9:
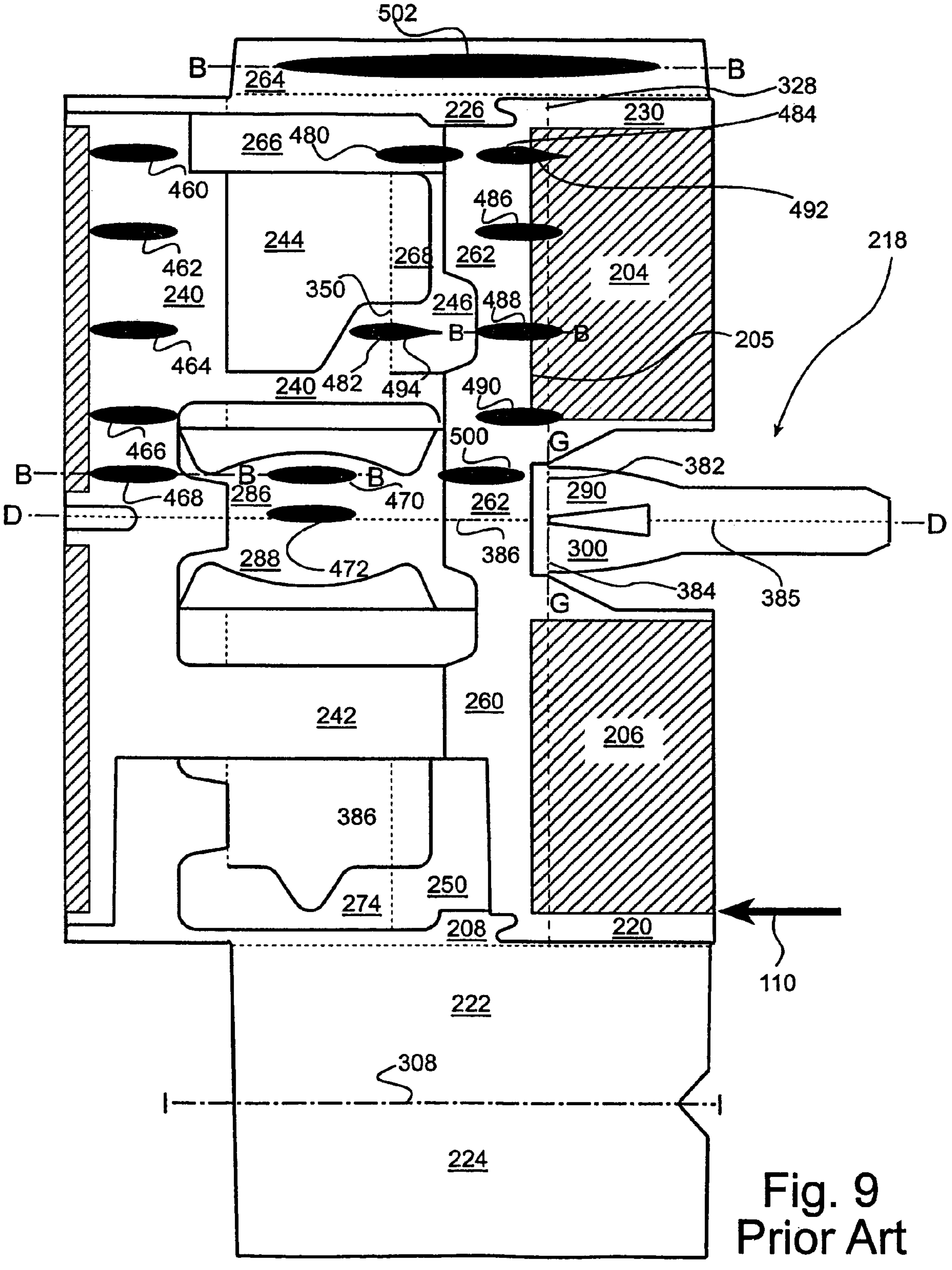
Fig. 9 Prior Art
FIG. 9 is a top view of a fourth intermediate form of the conventional carton blank of FIGS. 4 and 5.

Referring to FIG. 23A, the blank 1000, the first intermediate form 1002, the second intermediate form 1004 and the third intermediate form 1006 (FIG. 23B) may be processed in the x-axis subsystem 1020 (FIG. 12). The actions of gluing and folding performed on the blank 200, the first intermediate form 212 and the second intermediate form 214 in the x-axis subsystem 102 may, for example, be substantially similar to the gluing and folding that may occur in the x-axis subsystem 1020 as previously described. Therefore, the blank 1000 may be substantially similar to the conventional blank 200. The first intermediate form 1002 may be substantially similar to the conventional first intermediate form 212. The second intermediate form 1004 may be substantially similar to the conventional second intermediate form 214. The third intermediate form 1006 may be substantially similar to the conventional third intermediate form 216. Since the features of the blank 1000 may be substantially similar to the blank 200 and the folding operations may be substantially similar, the same reference numerals used in FIGS. 4 and 5 will be retained. Additional glue areas may be provided and will now be described.

Figure 26:
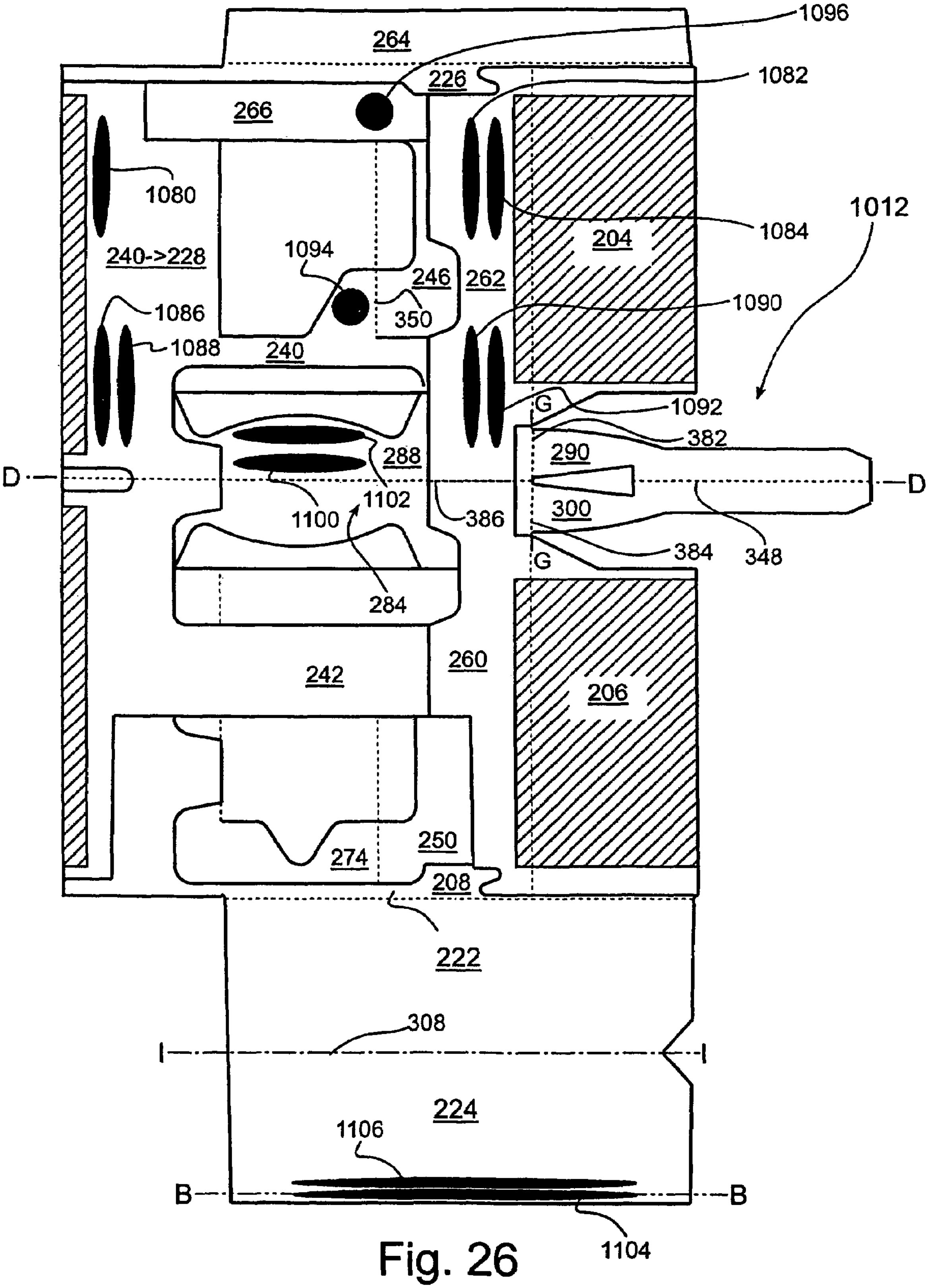
FIG. 26 is a top view of sixth intermediate form manufactured in the improved right angle gluing machine of FIG. 13.

Referring to FIG. 26, the sixth intermediate form 1012 (which is an in-process version of the blank 1000) may be provided with a first x-direction glue area 1080, a second x-direction glue area 1082, a third x-direction glue area 1084, a fourth x-direction glue area 1086, a fifth x-direction glue area 1088, a sixth x-direction glue area 1090, a seventh x-direction glue area 1092, a first y-direction glue area 1100, a second y-direction glue area 1102, a third y-direction glue area 1104, a fourth y-direction glue area 1106, a first stationary glue area 1094 and a second stationary glue area 1096. The first x-direction glue area 1080, the fourth x-direction glue area 1086 and the fifth x-direction glue area 1088 may be provided on the laminate film side of the left front portion 228. The second x-direction glue area 1082, the third x-direction glue area 1084, the sixth x-direction glue area 1090 and the seventh x-direction glue area 1092 may be provided on the laminate film side of the right back glue flap 262. The first y-direction glue area 1100 and the second y-direction glue area 1102 may be provided on the paperboard side of the back handle portion 288. The third y-direction glue area 1104 and the fourth y-direction glue area 1106 may be provided on the paperboard side of the bottom front panel 224. The first stationary glue area 1094 may be provided on the laminate film side of the front spine 240. The second stationary glue area 1096 maybe provided on the paperboard side of the front partition glue flap 266.

After the third intermediate form 1006 has been created, the third intermediate form 1006 may enter the transfer system 600 in traveling in a x-axis direction 1022 as shown in FIG. 13. The third intermediate form 1006 may be guided into the transfer system 600 by the cover assembly 614 and the platen 628 (FIG. 14). The cover assembly 614 urges the third intermediate form 1006 downward while the platen 628 urges the third intermediate form 1006 upward, thereby capturing the third intermediate form 1006. The speed of the third intermediate form 1006 may be monitored by the encoder 882. The encoder 882 sends information to the control computer 884. The control computer 884 communicates to each of the individual control interfaces 866 of the first glue dispenser 1050, the second glue dispenser 1052, the third glue dispenser 1054, the fourth glue dispenser 1056, the fifth glue dispenser 1058, the sixth glue dispenser 1060, the seventh glue dispenser 1062 and the eighth glue dispenser 1064. The sensor 900 communicates with the control computer 884 to detect the presence of the third intermediate form 1006 to make certain that glue is applied to the third intermediate form 1006, rather than dispensing glue onto the platen 628.

Figure 24:
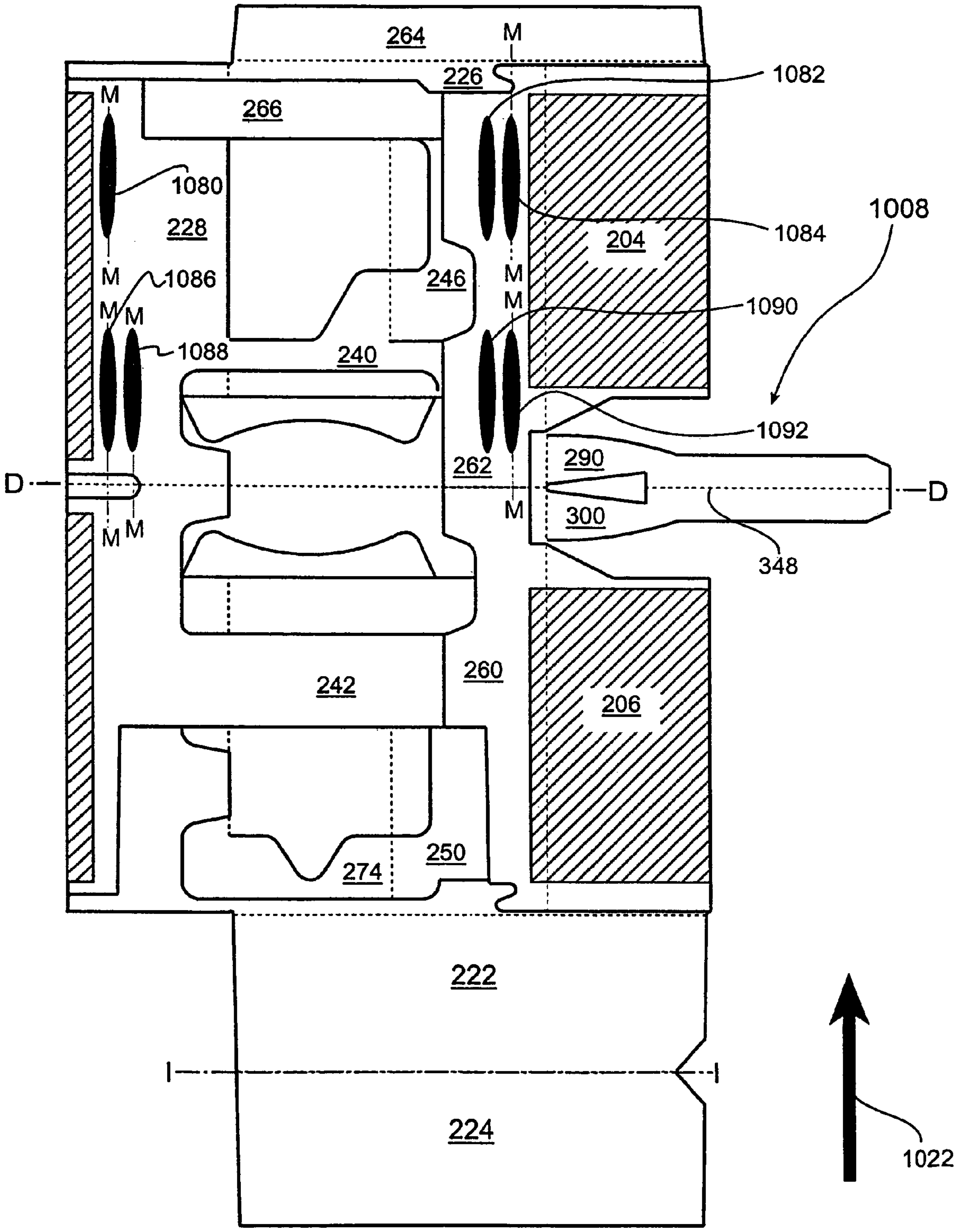
FIG. 24 is a top view of a fourth intermediate form manufactured in the improved right angle gluing machine of FIG. 13.

Referring to FIG. 24, the third intermediate form 1006 may receive glue along lines that are parallel to the x-axis direction 1022 and may be converted to the fourth intermediate form 1008. Glue may be applied to the first x-direction glue area 1080, the second x-direction glue area 1082, the third x-direction glue area 1084, the fourth x-direction glue area 1086, the fifth x-direction glue area 1088, the sixth x-direction glue area 1090 and the seventh x-direction glue area 1092 to convert the third intermediate form 1006 to the fourth intermediate form 1008. Glue may be applied to the first x-direction glue area 1080 and the fourth x-direction glue area 1086 by the third glue dispenser 1054 (FIG. 22). Glue may be applied to the second x-direction glue area 1082 and the sixth x-direction glue area 1090 by the seventh glue dispenser 1062. Glue may be applied to the third x-direction glue area 1084 and the seventh x-direction glue area 1092 by the eighth glue dispenser 1064. Glue may be applied to the fifth x-direction glue area 1088 by the fourth glue dispenser 1056. In order to apply the x-direction glue strips, the third glue dispenser 1054, the fourth glue dispenser 1056, the seventh glue dispenser 1062 and the eighth glue dispenser 1064 dispense hot glue for a period of time as the third intermediate form 1006 travels in the x-axis direction 1022 after entering the transfer system 600 and before contacting the V-stop 630 (FIG. 13).

Figure 25:
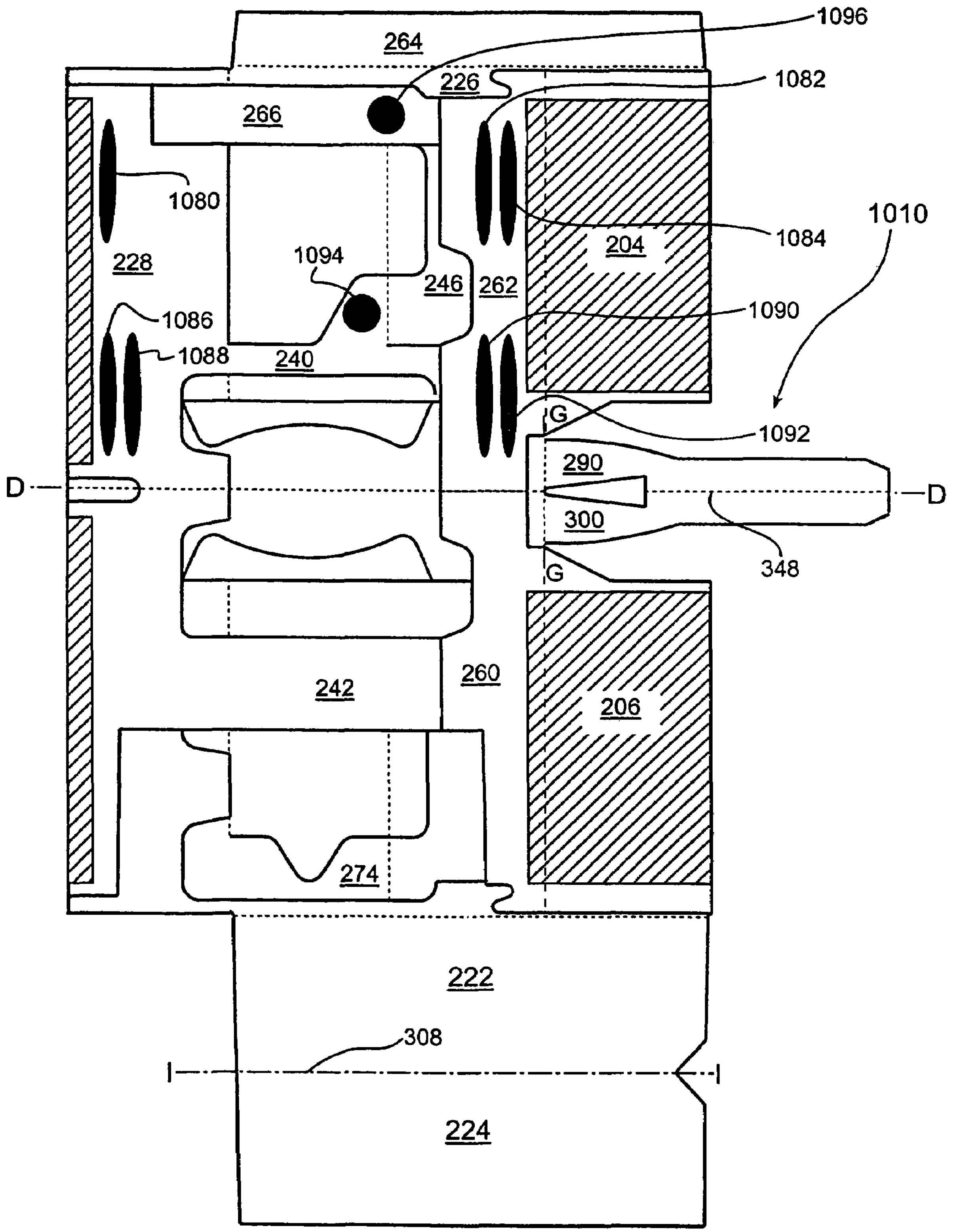
FIG. 25 is a top view of fifth intermediate form manufactured in the improved right angle gluing machine of FIG. 13.

Referring to FIG. 25, the fourth intermediate form 1008 (FIG. 24) receives glue during a stationary period and is converted to the fifth intermediate form 1010. Glue is applied to the first stationary glue spot 1094 and the second stationary glue spot 1096 during the stationary period. The stationary period may be the time that the fourth intermediate form 1008 is not moving. The stationary period may commence when the fourth intermediate form 1008 (FIG. 24) contacts the V-stop 630 and prior to the right lug 906 (FIG. 14) and the left lug 908 (FIG. 14) contacting the fifth intermediate form 1010. Glue may be applied to the first stationary glue spot 1094 by the fifth glue dispenser 1058 (FIG. 22). Additionally, glue may be applied to the second stationary glue spot 1096 by the sixth glue dispenser 1060 (FIG. 22). Due to delays associated with dispensing glue from the glue dispensers 1058, 1060, the glue may be dispensed prior to actual initiation of the stationary period. These delays are a result of lags in the control system such as powering of the solenoid and mechanical delays such as travel time for the glue nozzle to the fourth intermediate form 1008 (FIG. 24).

Referring to FIG. 12, the fifth intermediate form 1010 may be driven in the y-axis direction 1032 by the right lug 906 and the left lug 908. While moving in the y-axis direction 1032 glue may be applied to convert the fifth intermediate form 1010 to the sixth intermediate form 1012. Referring to FIG. 26, glue may be applied to the first y-direction glue area 1100, the second y-direction glue area 1102, the third y-direction glue area 1104 and the fourth y-direction glue area 1106 to the fifth intermediate form 1010 to create the sixth intermediate form 1012. Glue applied to the first y-direction glue area 1100 may be applied by the third glue dispenser 1054 (FIG. 22). Glue applied to the second y-direction glue area 1102 may be applied by the fourth glue dispenser 1056 (FIG. 22). Glue applied to the third y-direction glue area 1104 may be applied by the first glue dispenser 1050 (FIG. 22). Glue applied to the fourth y-direction glue area 1106 may be applied by the second glue dispenser 1052 (FIG. 22). Having applied glue to the first y-direction glue area 1100, the second y-direction glue area 1102, the third y-direction glue area 1104 and the fourth y-direction glue area 1106 to the fifth intermediate form 1010 (FIG. 25), the fifth intermediate form 1010 may be converted to the sixth intermediate form 1012.

Figure 27:
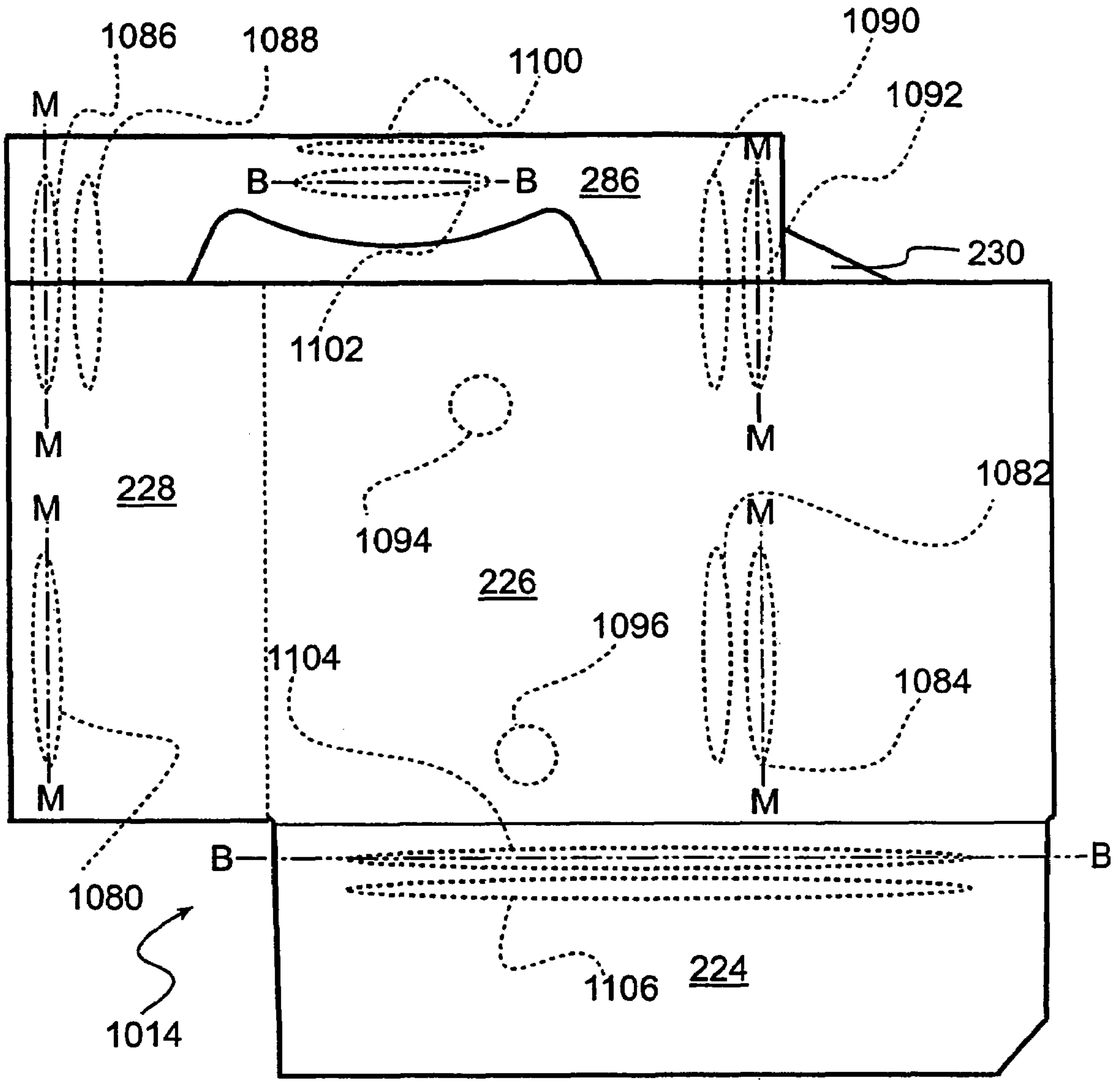
FIG. 27 is a top view of a completed carrier manufactured in the improved right angle gluing machine of FIG. 13.

Referring to FIG. 12, the sixth intermediate form 1012 may exit the transfer system 600 traveling in the y-axis direction 1032. The sixth intermediate form 1012 may enter the y-axis subsystem 1030 upon exiting the transfer system 600. The sixth intermediate form 1012 may enter the y-axis progressive folding station 1040 and may be converted to the completed carrier 1014. Referring to FIG. 26, the first operation in the y-axis progressive fold station 1040 (FIG. 12) may be folding the front handle reinforcement portion 290 about the right front handle fold line 382 (also G-G). The front handle reinforcement portion 290 may be operatively attached to the back handle reinforcement portion 300 by the right back handle fold line 384. Therefore, folding the front handle reinforcement portion 290 about the right front handle fold line 382 will result in the folding of back handle reinforcement portion 300 about the right back handle fold line 384 (G-G). Folding of the front handle reinforcement portion 290 and the back handle reinforcement portion 300 may result in the glue located on the first y-direction glue area 1100 attaching to the paperboard side of the front handle reinforcement portion 290 and the back handle reinforcement portion 300 to the handle 284. The folding of the front handle reinforcement portion 290 and the back handle reinforcement portion 300 also captures the right front glue flap 262 and the right back glue flap 260 near the right glue flap center fold line 386 between the front handle reinforcement portion 290 and back handle reinforcement portion 300 and the handle 284. Next the front panel 226 and all the portions operatively attached thereto may be folded along the spine fold line D-D. The glue located on the first x-direction glue area 1080, the fourth x-direction glue area 1086 and the fifth x-direction glue area 1088 may contact the film side of the back spine 242. The folding of the front panel 226 about spine fold line D-D may also cause the glue located on the second stationary glue spot 1096 to contact the paperboard side of the back partition glue flap 274. The glue located on the second x-direction glue area 1082, the third x-direction glue area 1084, the sixth x-direction glue area 1090 and the seventh x-direction glue area 1092 may contact the film side of the right back glue flap 260. The next fold in the y-axis progressive fold station 1040 (FIG. 12) may be the folding of the bottom front panel 224 about the center bottom fold line 308 (also I-I). The folding about line I-I may result in the glue located on the third y-direction glue area 1104 and the glue located on the fourth y-direction glue area 1106 contacting the laminate film side of the 264. The folding performed at the y-axis progressive fold station 1040 results in the conversion of the sixth intermediate form 1012 to the completed carrier 1014 (FIG. 27).

Referring to FIG. 12, the completed carrier 1014 travels further in the y-axis subsystem 1030 to a compression stack 1044. As previously discussed, the compression stack 1044 is a collection of completed carriers receiving pressure for a period of time. The pressure and time allows for sufficient attachment between panels by the glue. After exiting from the y-axis subsystem 1030, a completed carrier 1014 may be erected into an opened package 1016. The erected carrier 1016 (FIG. 28) may receive six bottles for distribution.

Figure 28:
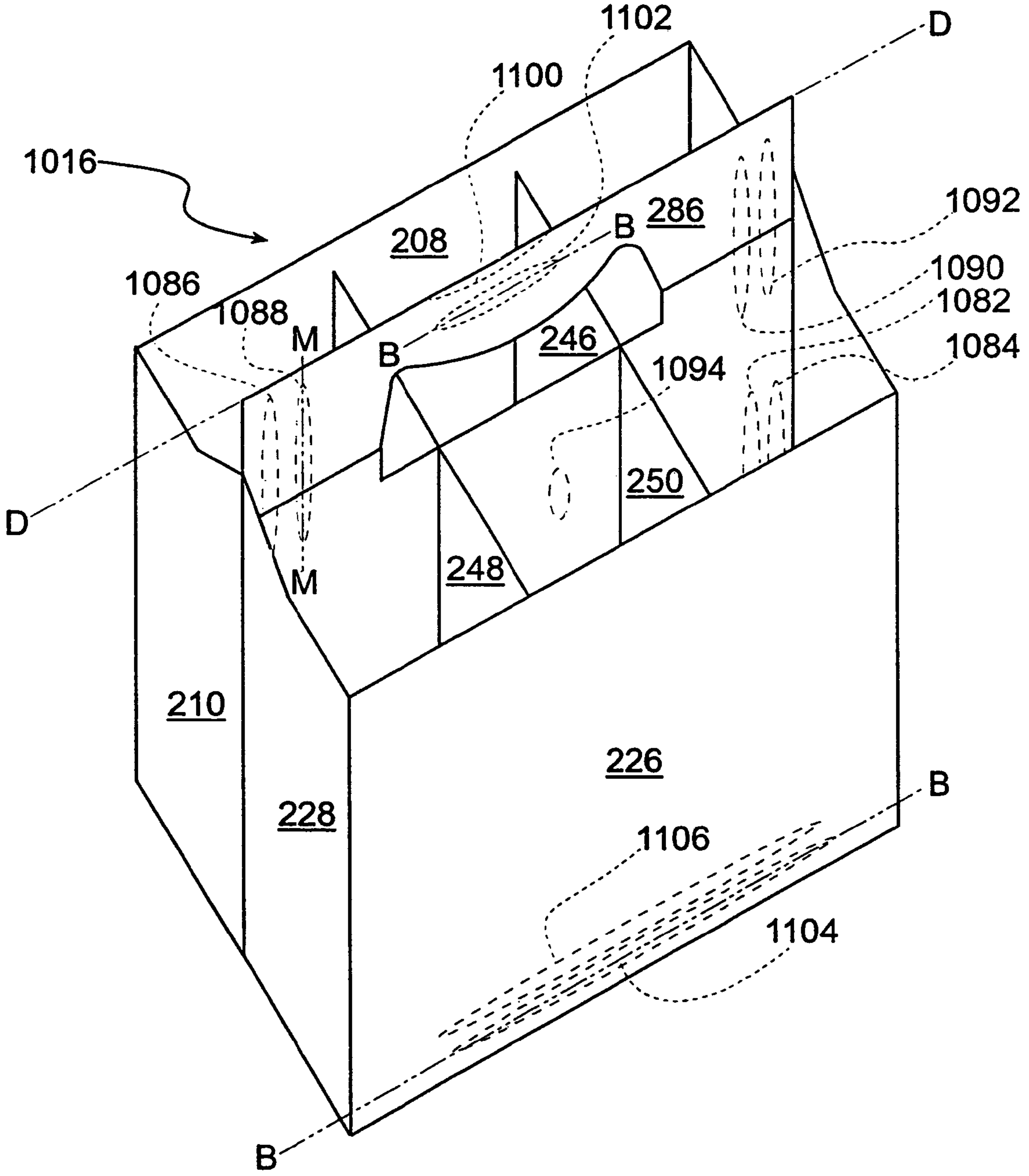
FIG. 28 is a perspective view of the carrier of FIG. 27 in an erected configuration.
Figure 29:
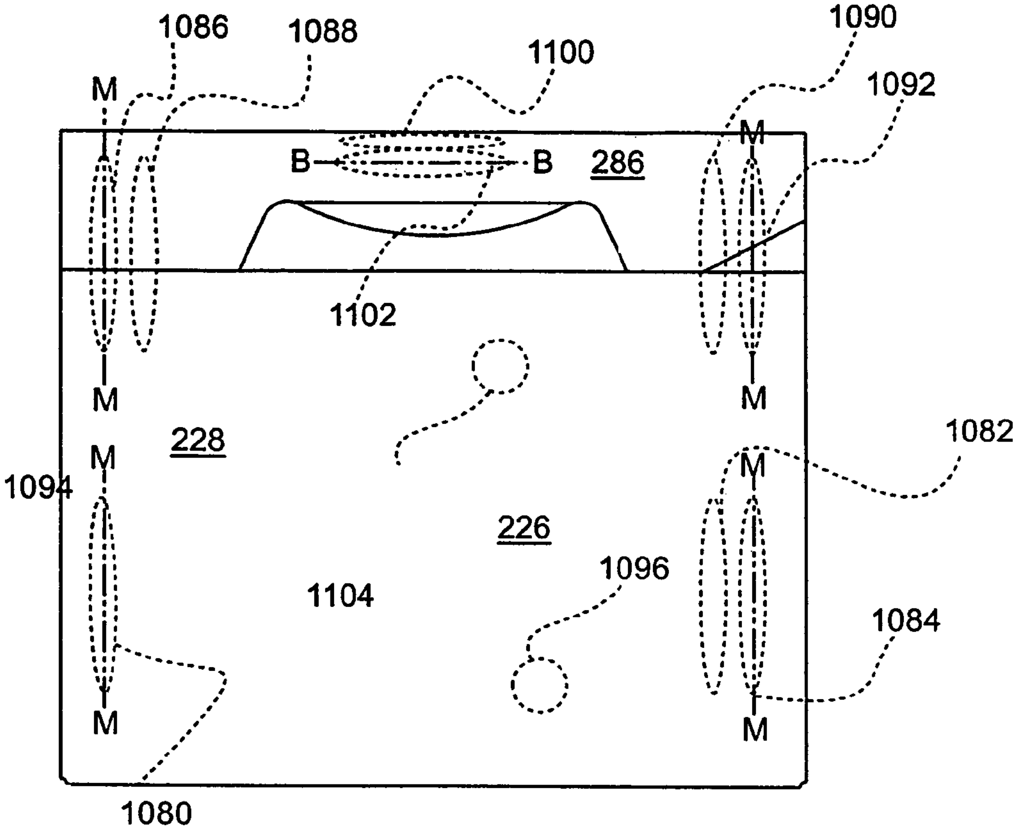
FIG. 29 is a side view of the erected carrier of FIG. 28.
Figure 30:
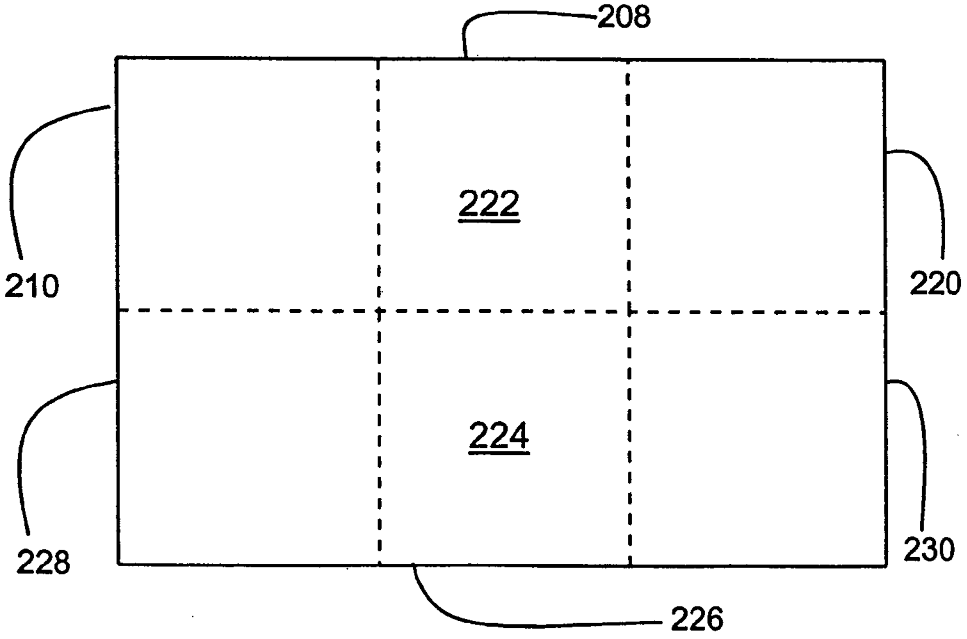
FIG. 30 is a bottom view of the erected carrier of FIG. 28.
Figure 31:
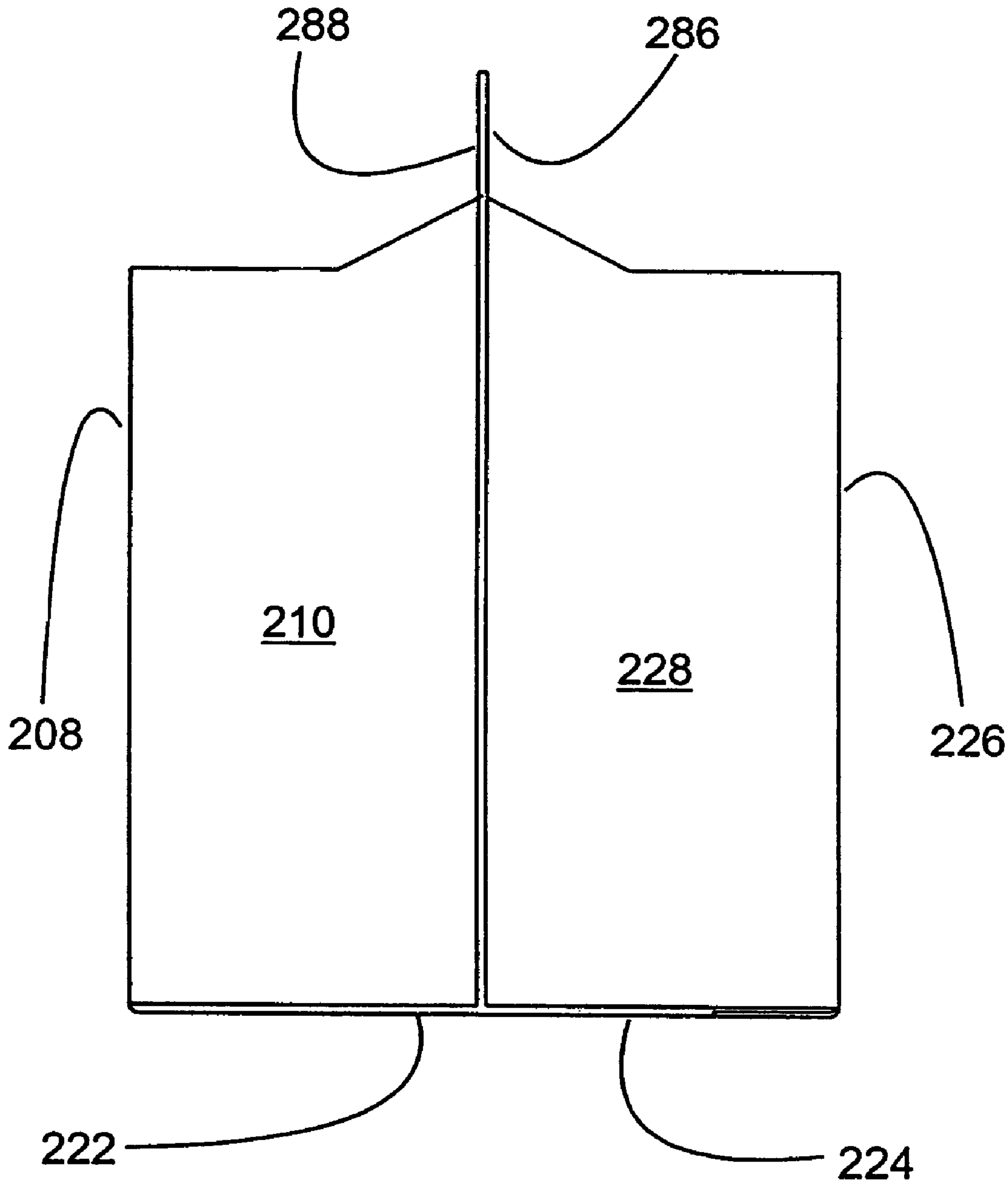
FIG. 31 is a right side view of the erected carrier of FIG. 28.

Referring to FIG. 28, the erected carrier 1016 may have glue placed in locations that do not conflict with the appearance or functioning of the carrier. The erected carrier 1016 is also shown in FIG. 29 in a front view. The erected carrier 1016 is also shown in FIG. 30 in a top view. The erected carrier 1016 is also shown in FIG. 31 in a right side view.

Figure 10:
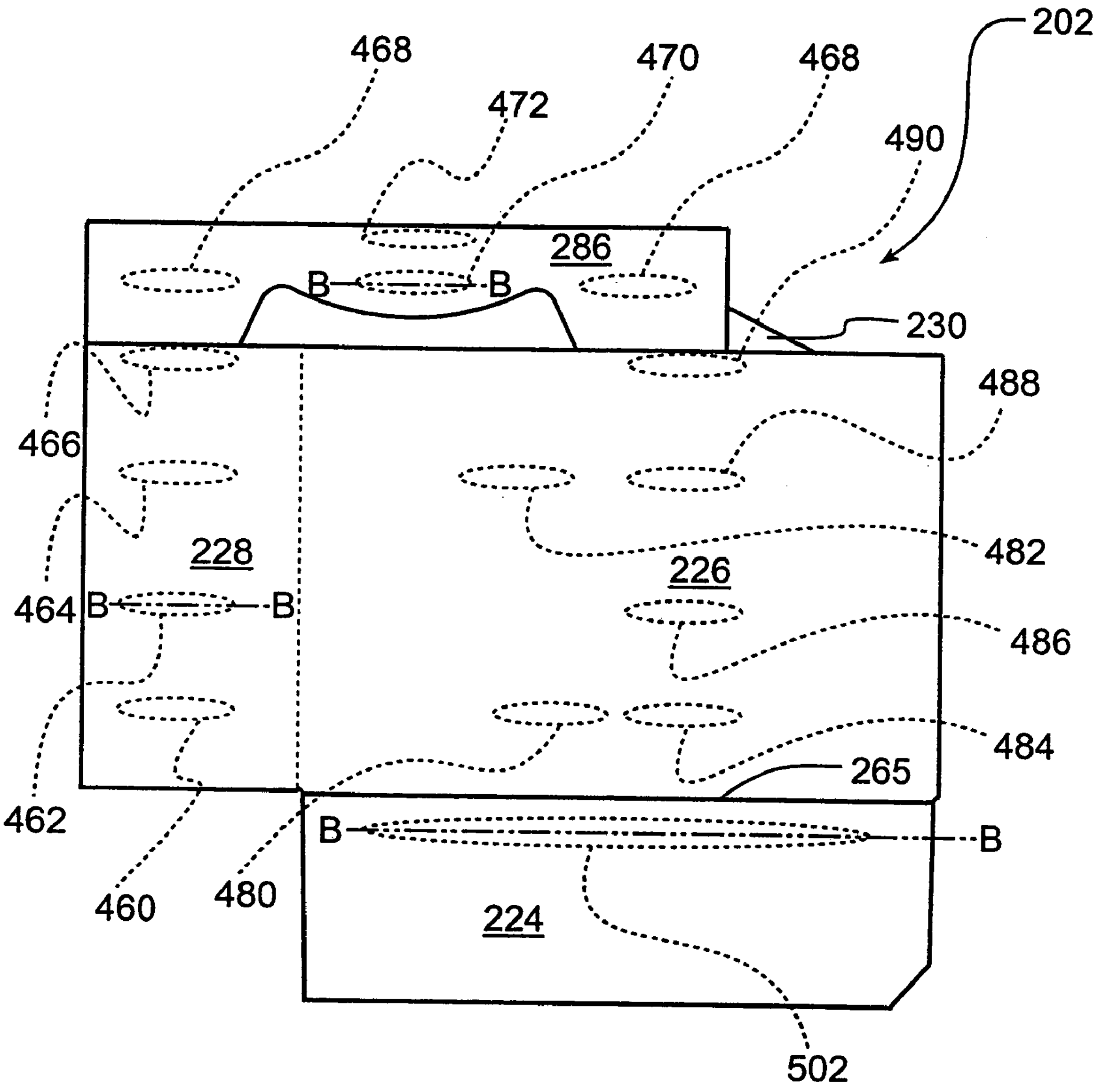
Fig. 10 Prior Art
FIG. 10 is a side view of a completed conventional package made from the conventional carton blank of FIGS. 4 and 5.
Figure 11:
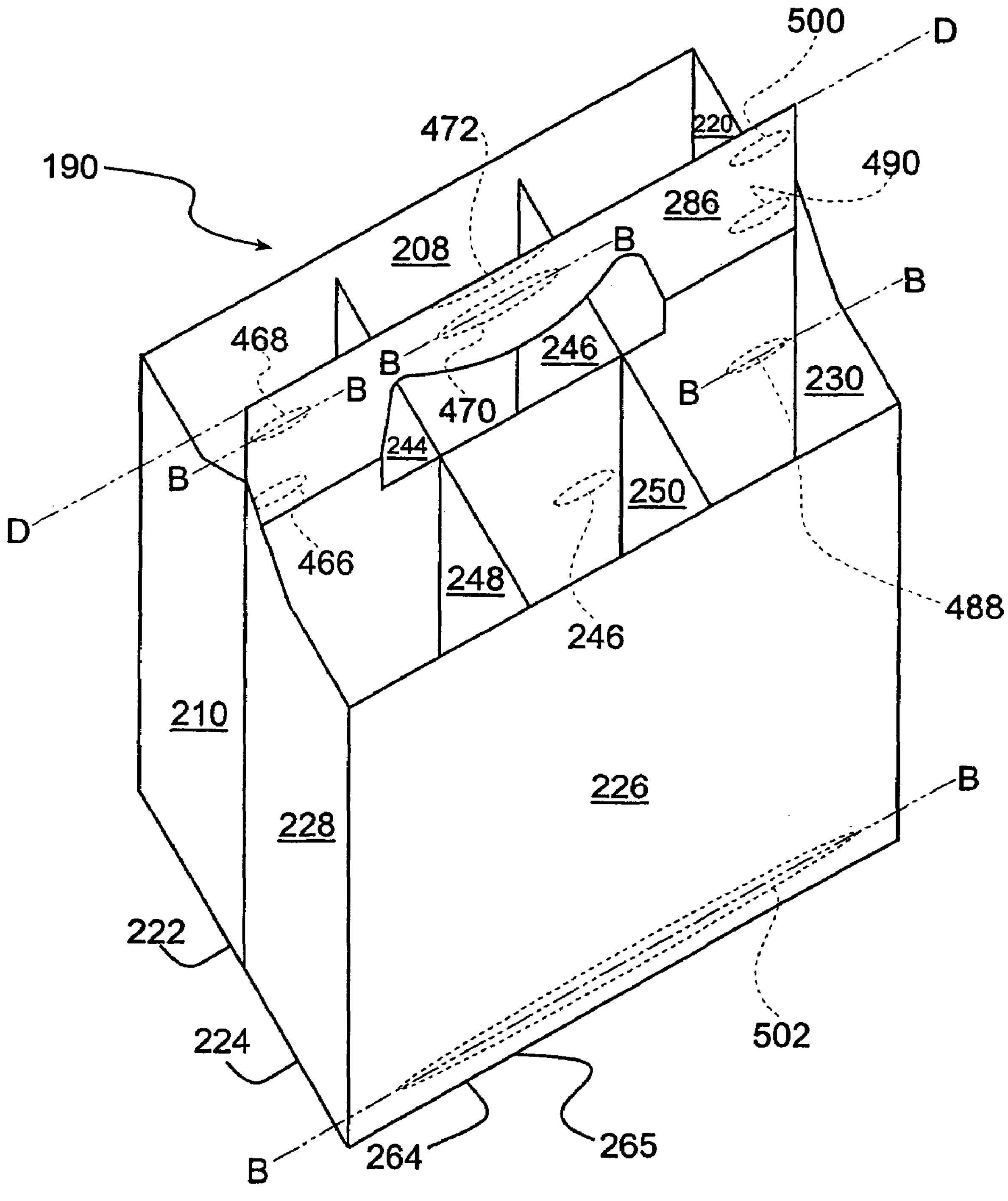
Fig. 11 Prior Art
FIG. 11 is a perspective view of the completed conventional package of FIG. 10 in an erected configuration.

When comparing the prior art completed carrier 202 (FIG. 10) to the completed carrier 1014 (FIG. 27), it is apparent that the hot melt glue is applied in locations that do not compromise the appearance or functioning of the carrier. A specific example of the improved gluing locations may be seen by comparing the seventh front spine glue area 468, the fifth right back glue area 488, the fourth right back glue area 486 and the third right back glue area 484, FIG. 10, to the sixth x-direction glue area 1090 the seventh x-direction glue area 1092, the second x-direction glue area 1082 and the third x-direction glue area 1084, FIG. 27.

As best shown in FIG. 27, the seventh x-direction glue area 1092 and the third x-direction glue area 1084 are close-to, but not overlapping the front glue flap fold line 328. Because the seventh x-direction glue area 1092 and the third x-direction glue area 1084 are not overlapping the front glue flap fold line 328, the right front panel 230 and the right back panel 220 are not attached by glue applied to the glue areas. When converting the completed carrier 1014 to the erected carrier 1016, the right back panel 220 and the right front panel 230 are able to separate as the folding occurs. Similar advantages may be evident with respect to the locations of the second stationary glue spot 1096 and the first stationary glue spot 1094.

The transfer system 600 allows for glue to be applied at fast speeds without compromising graphics or function of packages. The glue can be applied in three configurations whereas the prior art was only able to apply glue in one configuration. As a result, throughput may be increased and defects decreased with the improved right angle gluing machine 1001.

As shown in the figures and described in the specifications, the front handle reinforcement portion 290 and the back handle reinforcement portion 300 are folded in the y-axis progressive folding station 1040. An alternative, method of manufacturing the bottle carrier may be to fold the front handle reinforcement portion 290 and the 300 in the x-axis progressive folding station 126. Adhesive applied to hold the front handle reinforcement portion 290 and the back handle reinforcement portion 300, such as the first y-direction glue strip 1100 and the second y-direction glue strip 1102 may be applied by angling the third glue dispenser 1054 and the fourth glue dispenser 1056 under the front handle reinforcement portion 290 and the back handle reinforcement portion 300. After applying the first y-direction glue strip 1100 and the second y-direction glue strip 1102, the front handle reinforcement portion 290 and the back handle reinforcement portion 300 may be attached in a similar manner as previously described.

The exemplary application to a bottle carrier is provided for clarity of presentation and it can be appreciated that the ability to apply different glue configurations is advantageous to other packaging such as: soap boxes, cereal boxes, shirt boxes, can cartons, product displays, etc.

The previous description describes the application of glue to adhesively join various panels of the exemplary bottle carrier. It is to be appreciated that glue is a type of adhesive and that any adhesive could be used with the present apparatus and method. Some examples of adhesives, but not an exhaustive list, include: cold glue, hot glue, latex adhesives, ethyl vinyl acetates dissolved in carriers, rubber cement, cyanoacrylate, or the like.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. An adhesive application machine, comprising:

a first section extending in a first direction, the first section being configured to move a blank in the first direction, and comprising at least one first adhesive applicator configured to apply a first quantity of adhesive to the blank while the blank is moving in the first direction, wherein the machine is configured to fold the blank about at least one line after the first quantity of adhesive is applied;

a second section extending in a second direction substantially perpendicular to the first direction;

a transfer system positioned adjacent to the first section and the second section, the transfer system being configured to transfer the blank from the first section to the second section, wherein the transfer system comprises at least one second adhesive applicator configured to apply a second quantity of adhesive to the blank while the blank is moving in the first direction and while the blank is moving in the second direction; and a controller operatively connected to the at least one second adhesive applicator, the controller being configured to control the application of the second quantity of adhesive.

2. The machine of claim 1, wherein the at least one second adhesive applicator comprises a plurality of glue dispensers.

3. The machine of claim 2, wherein one or more of the glue dispensers is mounted to at least one mounting bar.

4. The machine of claim 1, wherein the at least one second adhesive applicator comprises at least one extrusion adhesive gun.

5. The machine of claim 4, wherein the at least one extrusion adhesive gun comprises at least one hot melt adhesive gun.

6. The machine of claim 1, wherein the transfer system further comprises:

at least one transition cover, wherein the transition cover comprises at least one adhesive spanning opening.

7. The machine of claim 1, wherein the transfer system further comprises:

a drive system comprising a motor and a plurality of drive chains.

8. The machine of claim 1, wherein the first section comprises:

at least one acceleration roll adjacent to the transfer system.

9. The machine of claim 8, wherein the transfer system further comprises:

encoder means for sensing a rotational speed of the at least one acceleration roll; and at least one sensor assembly.

10. The machine of claim 1, further comprising:

a base, wherein the base supports the at least one second adhesive applicator;

a frame mounted on the base; and a cover assembly.

11. The machine of claim 10, wherein the base comprises:

a platen;

a V-stop;

a right chain rack; and a left chain rack.

12. The machine of claim 1, wherein the frame comprises:

a raised mount;

a back cover slot;

a front cover slot; and a plurality of pivot knuckles.

13. The machine of claim 1, wherein the cover assembly comprises:

a transition cover;

a cover finger; and a glue clearing cover.

14. The machine of claim 1, wherein the first section comprises:

at least one first folding station.

15. The machine of claim 14, wherein the second section comprises:

at least one third glue application station; and at least one second folding station.

16. The machine of claim 15, wherein the machine is a ninety-degree adhesive application machine.

17. An adhesive application machine, comprising:

a first section extending in a first direction, the first section comprising at least one first glue application station and at least one first folding station;

a transfer system adjacent to the first section, the transfer system comprising a frame, a drive system, and at least one adhesive applicator;

a second section adjacent to the transfer system, the second section extending in a second direction that is at least substantially perpendicular with respect to the first direction, the second section comprising at least one second glue application station and at least one second folding station; and a controller operatively connected to the at least one adhesive applicator, wherein the transfer system transfers a blank from the first direction to the second direction, wherein the at least one adhesive applicator is configured to apply a first quantity of adhesive to the blank while the blank is moving in the first direction, and a second quantity of adhesive to the blank while the blank is moving in the second direction, and the controller is configured to control the application of the second quantity of adhesive.

18. The machine of claim 17, wherein the at least one adhesive applicator comprises a plurality of glue dispensers mounted to at least one mounting bar.

19. The machine of claim 17, wherein the at least one adhesive applicator comprises at least one extrusion adhesive gun.

20. The machine of claim 17, wherein the transfer system further comprises:

at least one transition cover, wherein the transition cover comprises at least one adhesive spanning opening.

21. The machine of claim 17, wherein:

the first section further comprises at least one acceleration roll adjacent to the transfer system; and the transfer system further comprises encoder means for sensing a rotational speed of the at least one acceleration roll.

22. The machine of claim 17, further comprising a base, wherein the frame is mounted to the base, and wherein the base supports the at least one adhesive applicator; and a cover assembly having an adhesive spanning opening.

23. The machine of claim 17, wherein the base comprises:

a platen;

a right chain rack; and a left chain rack.

24. The machine of claim 22, wherein the cover assembly comprises:

a transition cover;

a cover finger; and a glue clearing cover.

25. The machine of claim 17, wherein the machine is a ninety-degree adhesive application machine.

26. The machine of claim 1, wherein the at least one second adhesive applicator is configured to apply the second quantity of adhesive while the blank is stationary after moving in the first direction.

27. The machine of claim 17, wherein the at least one adhesive applicator is configured to apply the second quantity of adhesive while the blank is stopped from moving in the first direction.

28. The machine of claim 1, wherein the controller is operatively connected to the at least one first adhesive applicator, and is configured to control the application of the first quantity of adhesive.

29. The machine of claim 17, wherein the controller is configured to control the application of the first quantity of adhesive.

* * * * *